United States Patent [19]
Tsutsui et al.

[11] Patent Number: 5,918,200
[45] Date of Patent: Jun. 29, 1999

[54] STATE ESTIMATING APPARATUS

[75] Inventors: Hiroaki Tsutsui; Atsushi Kurosaki; Kazuyuki Kamimura; Tadahiko Matsuba, all of Tokyo, Japan

[73] Assignee: Yamatake-Honeywell Co., Ltd., Tokyo, Japan

[21] Appl. No.: 08/109,179

[22] Filed: Aug. 19, 1993

[30] Foreign Application Priority Data

| Aug. 31, 1992 | [JP] | Japan | 4-253657 |
| Sep. 14, 1992 | [JP] | Japan | 4-269129 |
| Dec. 28, 1992 | [JP] | Japan | 4-358805 |
| Mar. 26, 1993 | [JP] | Japan | 5-090423 |

[51] Int. Cl.$^6$ ................................................. G06F 17/00
[52] U.S. Cl. ............................ 702/180; 706/54; 706/61; 364/528.11
[58] Field of Search ............................ 395/10, 22, 51, 395/77; 364/554, 149, 150, 164, 165, 505, 557, 550, 528.11; 236/46 R; 165/12; 377/13, 14, 15, 16; 706/45, 54, 61; 702/180

[56] References Cited

U.S. PATENT DOCUMENTS

| 4,542,463 | 9/1985 | Uetani | 364/554 |
| 4,642,782 | 2/1987 | Kemper et al. | 364/550 |
| 4,672,531 | 6/1987 | Uetani | 364/164 |
| 4,777,585 | 10/1988 | Kokawa et al. | 364/164 |
| 4,872,122 | 10/1989 | Altschuler et al. | 364/554 |
| 4,897,798 | 1/1990 | Cler | 364/550 |
| 5,187,673 | 2/1993 | Carver, Jr. et al. | 364/554 |
| 5,224,206 | 6/1993 | Simoudis | 395/77 |
| 5,243,689 | 9/1993 | Yoshiura et al. | 395/51 |
| 5,257,206 | 10/1993 | Hanson | 364/149 |
| 5,317,677 | 5/1994 | Dolan et al. | 395/10 |
| 5,319,739 | 6/1994 | Yoshiura et al. | 395/51 |
| 5,325,466 | 6/1994 | Kornacker | 395/77 |

FOREIGN PATENT DOCUMENTS 0 488 150   6/1992   European Pat. Off. .

OTHER PUBLICATIONS

"Case–Based Reasoning from DARPA: Machine Learning Program Plan", Proceedings Workshop on Case–Based Reasoning, May 1989, pp. 1–13.

Kopeikina et al., "Case Based Reasoning for Continuous Control", Proceedings Workshop on Case–Based Reasoning, May 1988, pp. 250–259.

Morishima et al., "Automatic Rule Extraction from Statistical Data and Fuzzy Tree Search", Systems and Computers in Japan, vol. 19, No. 5, 1988, pp. 26–36.

Riesbeck, "An Interface for Case–Based Knowledge Acquisition", Proceedings Workshop on Case–Based Reasoning, May 1988, pp. 312–326.

Turner, "Organizing and Using Schematic Knowledge for Medical Diagnosis", Proceedings Workshop on Case–Based Reasoning, May 1988, pp. 435–446.

(List continued on next page.)

*Primary Examiner*—Eric B. Stamber
*Attorney, Agent, or Firm*—Lane, Aitken & McCann

[57] ABSTRACT

In a state estimating apparatus, an input space quantization section quantizes an input space according to a required precision of output data. A storage section calculates and stores the number of times of occurrence of output data corresponding to each input event in the quantized input space, the mean values of the output data, and the change amounts of the output data. A neighborhood definition section calculates an input space neighborhood satisfying the required precision of the output. A similar case extraction section zooms up the predetermined neighborhood of the input space to the predetermined degree and extracts input case similar to the neighborhood from input case in the input space. A similarity determination section determines the similarity between the new input event and the extracted similar input cases on the basis of the degree of zooming. An estimating section selects input cases corresponding to the similarity from the similar input case, and estimates a value of output data corresponding to the new input event on the basis of the mean value of output data and the mean value of change amounts of the output data.

6 Claims, 18 Drawing Sheets

OTHER PUBLICATIONS

Tsatsoulis et al., "Case–Based Reasoning and Learning in Manufacturing with the TOLTEC Planner", IEEE Trans. on Systems, Man and Cybernetics, vol. 23, No. 4, Jul./Aug. 1993, pp. 1010–1023.

P.C. Young et al., "Recursive Estimation and Modelling of Nonstationary and Nonlinear Time–Series", Adaptive Systems in Control and Signal Processing. Selected Papers 3rd IFAC Symposium, Apr. 19–21, 1989, Glasgow, Apr. 19, 1989.

I. Hanazaki et al., A State Estimation of Finite State System by Using Fuzzy Algorithm and Its Application, Transactions of the Institute of Electrical Engineers of Japan, Part C, Jul.–Aug. 1994, Japan, vol. 114–C, No. 7–8, ISSN 0385–4221, pp. 805–812, XP–002067216.

W. Pedrycz, "Fuzzy modelling: Fundamentals, construction and evaluation", Fuzzy Sets and Systems 41 North–Holland, (1991), pp. 1–15.

Behnam Bavarian, "Special Section on Neural Networks for Systems and Control", IEEE Control Systems Society, Apr. 1988, total 6 pages.

William T. Illingworth, "Beginners Guide to Neural Networks", IEEE AES Magazine, Sep. 1989, pp. 44–49.

Dr. Daniel Chester, "New Trends in Neural Networks", Scientific Computing & Automation, May 1992, pp. 43–48.

Mark Beale et al., "Building a Neural Network Application", Scientific Computing & Automation, May 1992, pp.19–21.

Bart Kosko et al., "Fuzzy Logic", Scientific American, Jul. 1993, pp. 76–80.

Daniel G. Schwartz et al., "Fuzzy logic Flowers in Japan", IEEE Spectrum, Jul. 1992, pp. 32–35.

Don R. Hush et al., "Progress in Supervised Neural Networks", IEEE Signal Processing Magazine, Jan. 1993, pp. 8–39.

Ken Anderson, "Control systems sample life in the fuzzy lane", Personal Engineering & Instrumentation News, Oct. 1992, pp. 78–81.

Shun–ichi Amari, "Mathematical Foundations of Neurocomputing", Proceedings of the IEEE, vol. 78, No. 9, Sep. 1990, total 21 pages.

Joseph Schmuller, "Three Faces of Fuzziness Theory, Practice, and Applications" PC AI, Mar./Apr. 1993, total 3 pages.

Laura Burke, "Assessing a Neuroal Net Validation Procedures", PC AI, Mar./Apr. 1993, total 8 pages.

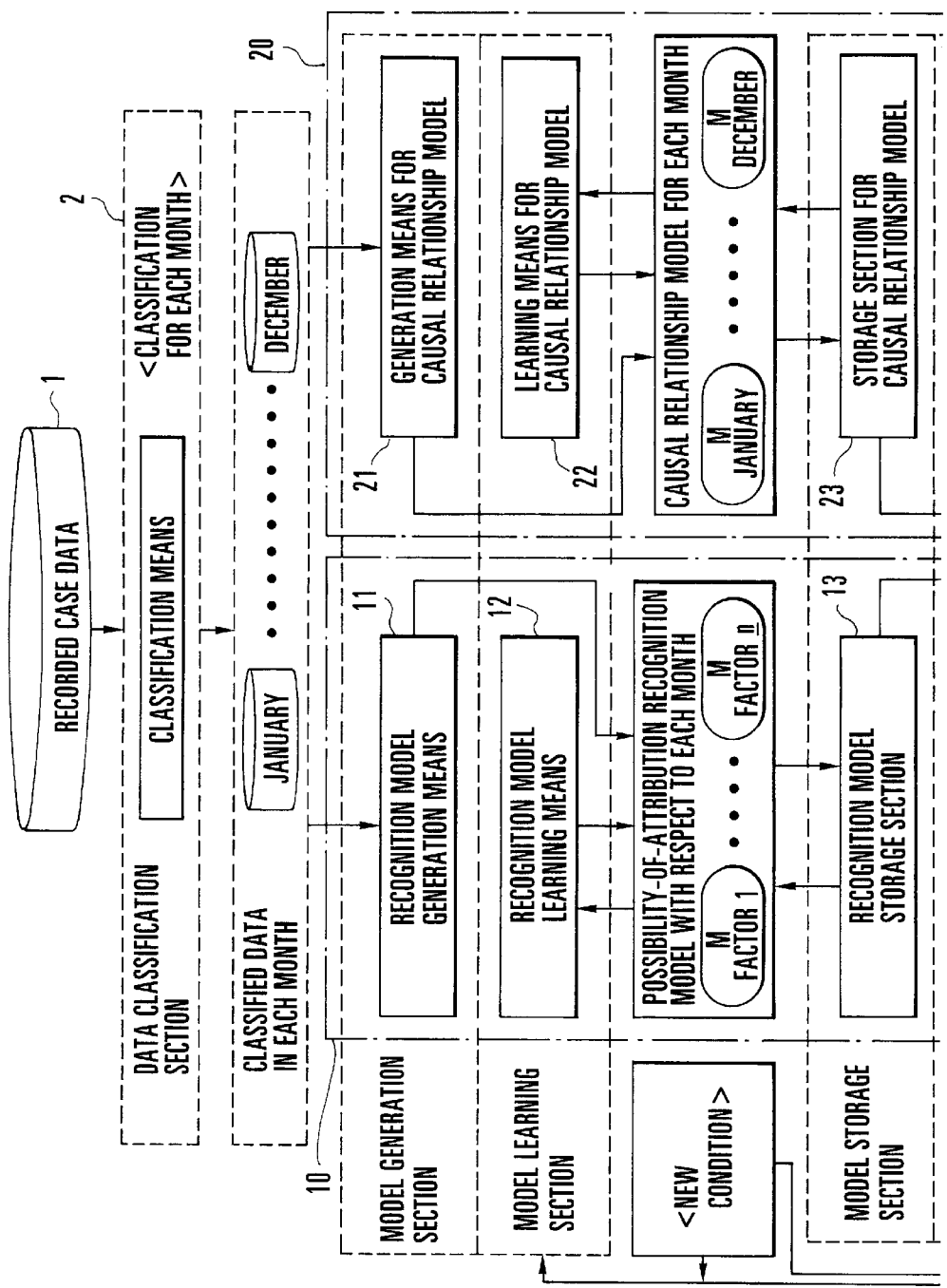

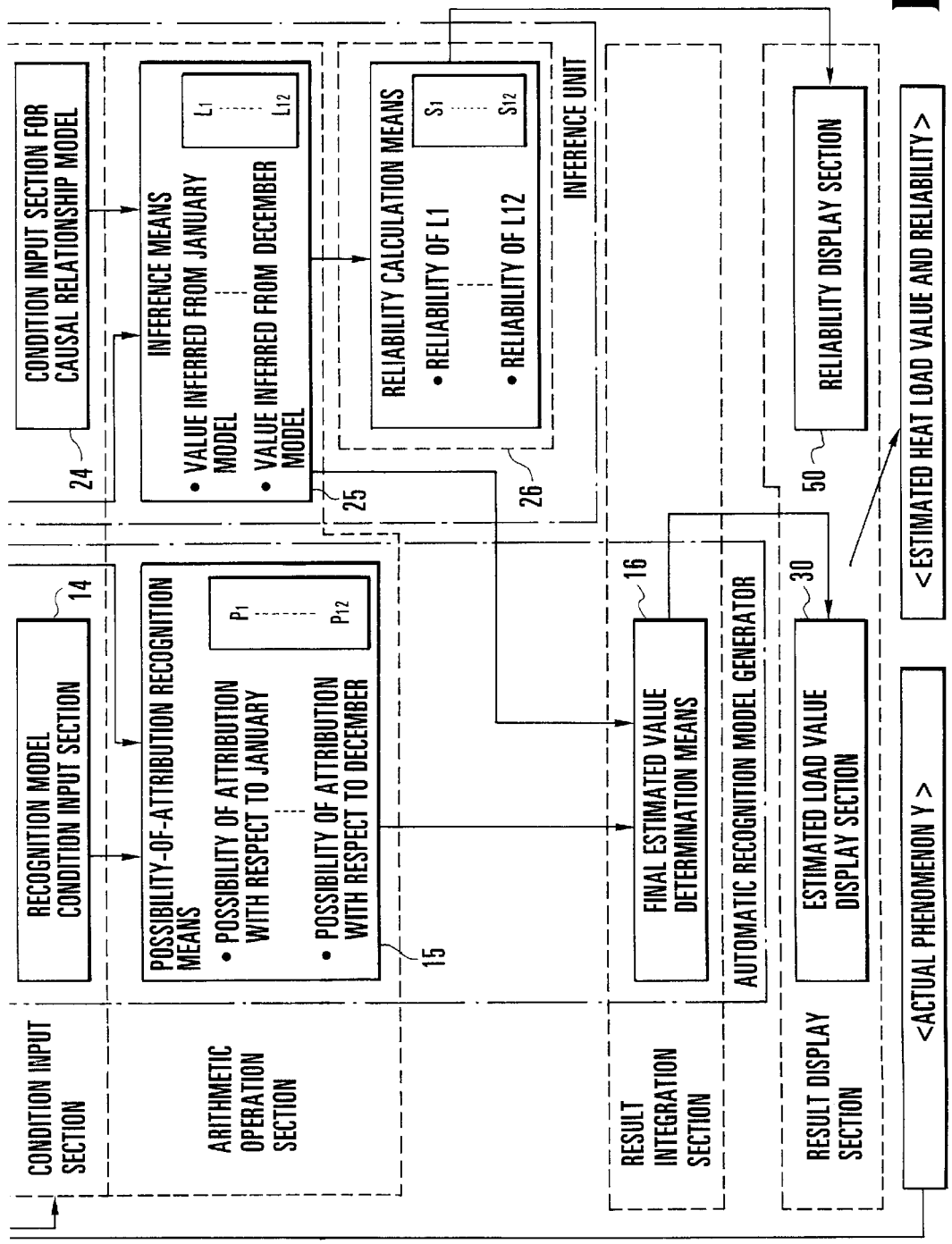

$(i=1, \cdots, 12)$
$(j=1, \cdots, n)$

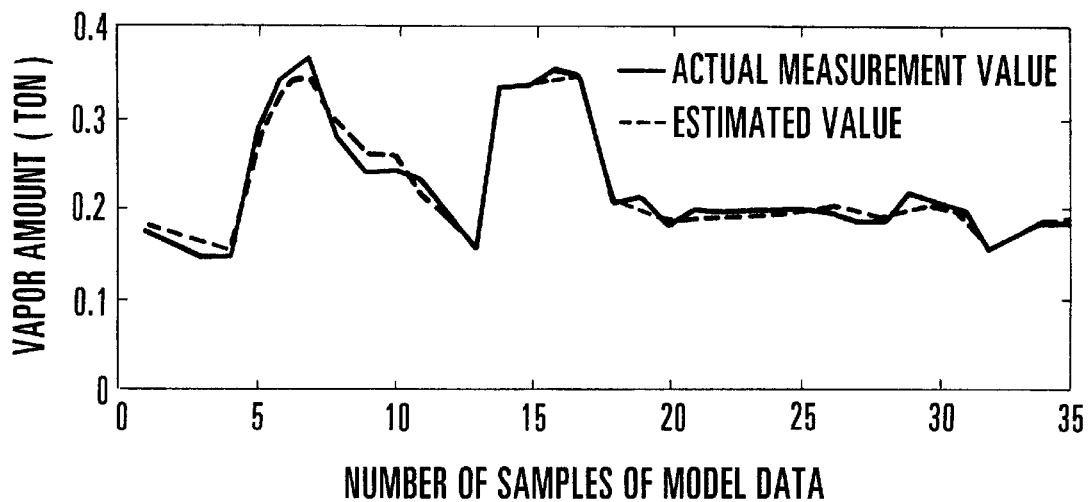
F I G. 19
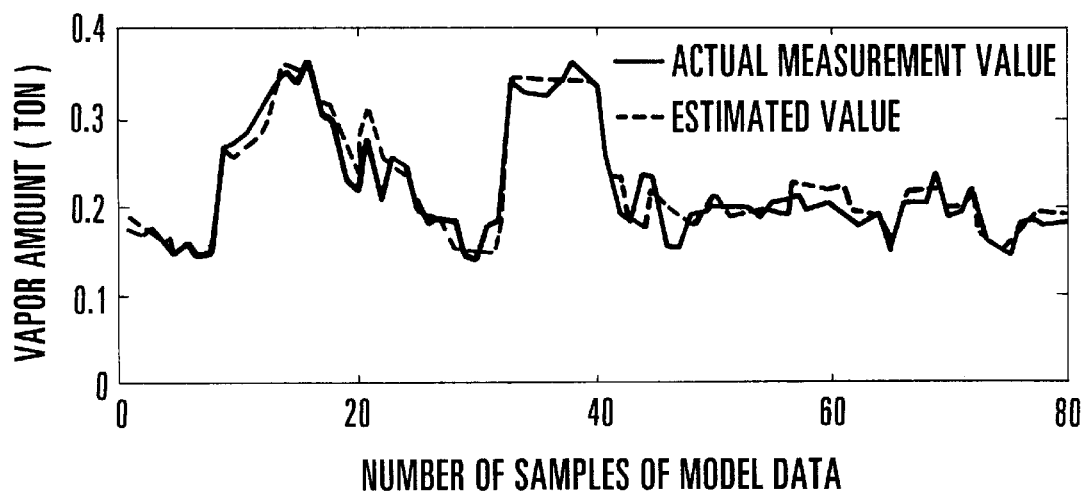
F I G. 20

STATE ESTIMATING APPARATUS

BACKGROUND OF THE INVENTION

The present invention relates to a state estimating apparatus for estimating the state of a system on the basis of recorded input/output data for the system.

A state estimating apparatus of this type, designed to estimate the state of a system on the basis of recorded input/output data for the system, uses the following methods.

In the first method, linearity as represented by equation (1) is assumed between a plurality of input variables (x1, x2, x3, . . . , xn) and an output variable y as a target for the input variables. The coefficients (a1, a2, a3, . . . , an) of the respective input variables are determined by the least squares method such that the estimation error is minimized, thereby determining the output variable y.

$$y = a1*x1 + a2*x2 + a3*x3 + \ldots + an*xn \qquad (1)$$

The second method is a method called GMDH (group method of data handling).

In the first method, non-linear relationship between input and output variables is assumed. In contrast to this, in the second method, since an object to be treated is complicated, nonlinearity is assumed between input and output variables. That is, a mathematical model handled in the second method is expressed by a higher order polynomial such as equation (2):

$$y = \sum_{i=1}^{n1} ai * xi + \sum_{i=1}^{n2}\sum_{j=1}^{n3} aij * \xi * xj + \sum_{i=1}^{n4}\sum_{j=1}^{n5}\sum_{k=1}^{n6} aijk * xi * xj * xk + \ldots \qquad (2)$$

In the second method, in order to obtain an output variable y, the coefficients (ai, aij, aijk, . . . ) of the respective input variables are obtained. In addition, the orders (n1, n2, n3, . . . ) of the respective input variables are determined. Such parameters, e.g., coefficients and orders, of the respective input variables are selected and combined on the basis of predetermined criteria for evaluation. Note that these selecting and combining operations are performed in a trial-and-error manner.

In the third method, state estimation is performed by forming a fuzzy model. According to the third method, the relationship between input and output variables is expressed by IF-THEN rules as indicated in Table 1, and state estimation is performed on the basis of this rule.

TABLE 1

Rule 1:
IF x1 = big, x2 = small, . . . , xn = medium
THEN y = small
Rule 2:
IF x1 = big, x2 = small, . . . , xn = small
THEN y = medium
.
.
.
Rule m:
IF x1 = small, x2 = big, . . . , xn = small
THEN y = big These IF-THEN rules are based on either the knowledge and subjectivity of men or historical data. According to this rule, by providing membership functions as shown in FIGS. 23A and 23B for the respective input and output variables, fuzzy events can also be treated. These rules as qualitative descriptions and membership functions as quantitative descriptions correspond to parameters such as coefficients and orders obtained in the first and second methods.

The fourth method is a method of performing state estimation by using a neural network.

As shown in FIG. 24, a model of this neural network is generally constituted by a large number of nonlinear operators called neurons coupled to each other to form a network. In this case, the relationship between input and output variables of the neural network is determined by learning. That is, the relationship between input and output variables is obtained as the coupling weight of each neuron in the network by learning, thus forming a model between the input and output variables. In this case, the parameters of the model are determined by determining the structure and coupling weight of each neuron.

In the conventional first to fourth methods, since the state of a system is estimated by using mathematical expressions, a rule model, and the like, the following problems are posed.

In the first method, many types of input variables are treated, and hence many parameters of the input variables must be determined, resulting in various difficulties in forming an optimal model.

In addition, since a system exhibits a complicated state, state estimation cannot be performed by only a single model based on the above-mentioned linear expression (1). In practice, therefore, a model based on each linear expression or a model based on a complicated nonlinear expression such as equation (2) is required, and parameters are increased in number, resulting in more difficulty in handling models.

Since a system always changes, changes in the system must be reflected on a model by a learning function. In this case, it is necessary to easily modify the model. However, a model formed by converting data into parameters and rule data as in the conventional methods cannot be easily modified. Consequently, it is difficult to operate the system on-line.

Furthermore, a problem is posed in terms of handling of qualitative information of a model with respect to a new input state under insufficient data used for modeling, i.e., the reliability of the model. This is the most important point in the use of a model.

As described above, various problems are posed in the conventional methods. These problems are based on the fact that each method is designed to express the global state of a system by a standard model obtained by converting the state into several parameters.

A case-based inference apparatus is also available, which performs inference by directly using case data containing the mechanism of an input/output relationship without forming a standard model. Such an inference apparatus has an excellent local description, and hence has an excellent property of separating events from each other. Therefore, the apparatus is suitable for a description of a nonlinear phenomenon. In addition, since cases used for interference can be provided, the qualitative information of a model that is the relationship between new situation and the recorded cases in the case-base can be easily handled.

In the conventional case-based inference apparatus, the following methods and schemes are not generalized: ① a method of retrieving case data, ② a recording scheme of case data, ③ determination on the similarity between case data, ④ determination on the importance of case data, and ⑤ a method of correcting case data. Therefore, schemes depending on an object must be determined, and it is difficult to actually describe the state of a system on the basis of input/output data.

SUMMARY OF THE INVENTION

It is, therefore, an object of the present invention to introduce a topology (to be described later) into a conventional case-based inference apparatus for performing inference by directly using input/output data for a system so as to describe the system by using a scheme generated on the basis of time series data which change continuously, without standardizing the input/output relationship in the system.

In order to achieve the above object, according to the present invention, there is provided a state estimating apparatus for inferring a value of output data from a plurality of input data given as input factors and estimating a state of a system, the plurality of input data and the single output data being time series data which continuously change, and the input and output data having an implicit relationship which continuously changes, by comprising input space quantization means for quantizing an input space having the input data from case data indicating past input and output data stored in advance, in accordance with a required precision of the output data, storage means for calculating the number of times of occurrence of output data corresponding to each input event in the input space quantized by said input space quantization means, a mean value of the output data and a mean value of change amounts of the output data, and storing a set of the number of times of occurrence and the mean values as a causal relationship model, means for, on the basis of a concept of continuous mapping of a topology, calculating a neighborhood of the input space which satisfies the required precision of the output as a statistical amount of all input data of the case data, and expressing the calculated neighborhood of the input space as a quantization number by which the input space is quantized, similar case extraction means for, when a new input event is input, zooming up, or enlarging, the predetermined neighborhood of the input space to a predetermined degree, and extracting input case (or event) similar to the neighborhood from input case in the input space, similarity determination means for determining a similarity between the new input event and the extracted similar input case on the basis of the degree of zooming set when the similar input case are extracted, and estimating means for selecting input case corresponding to the similarity determined by said similarity determination means from the extracted similar input case, and estimating a value of output data corresponding to the new input event on the basis of the mean value of output data corresponding to the selected input case and the mean value of change amounts of the output data.

BRIEF DESCRIPTION OF THEWS DRAWINGS

Figure 6:
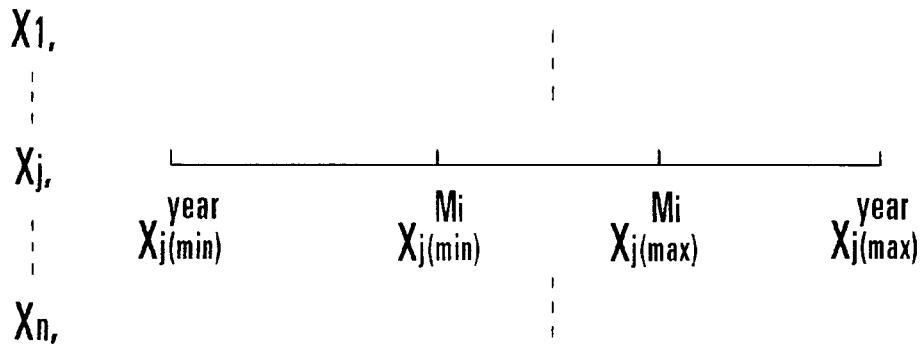
Figure 7:
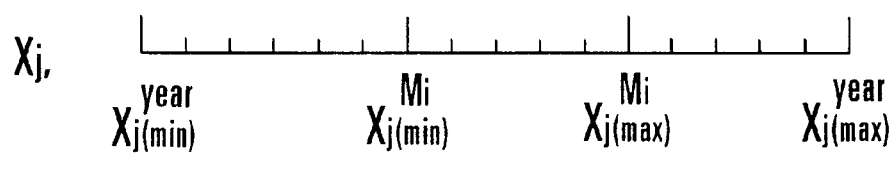
Figure 8:
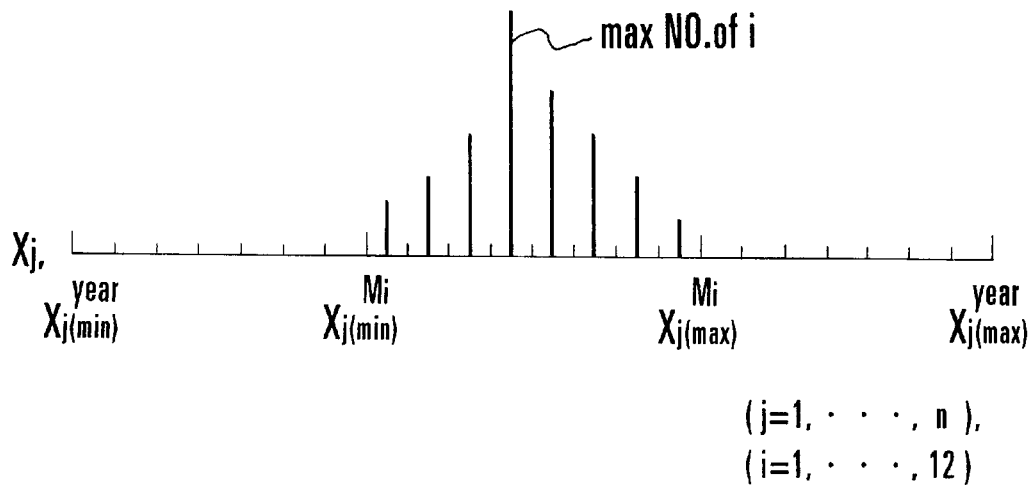
Figure 9:
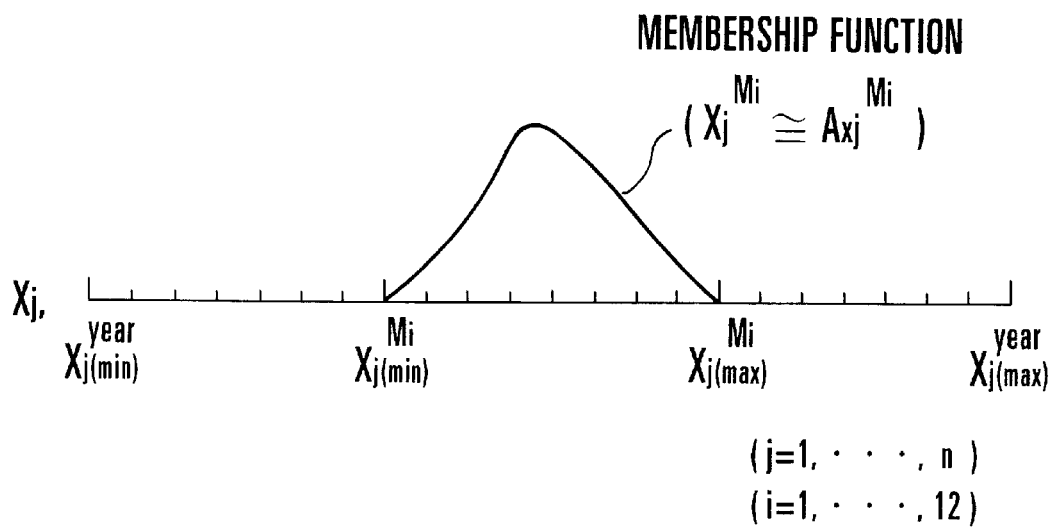
Figure 10:
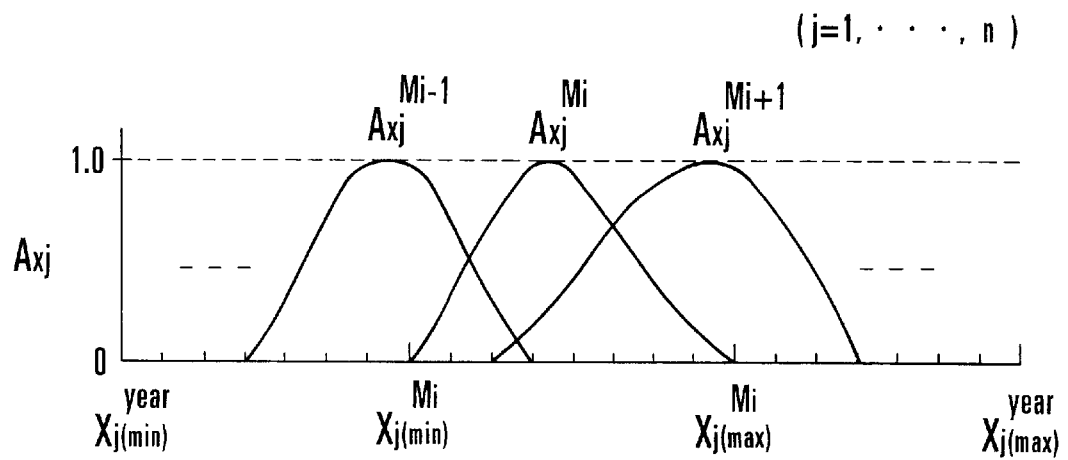
Figure 11:
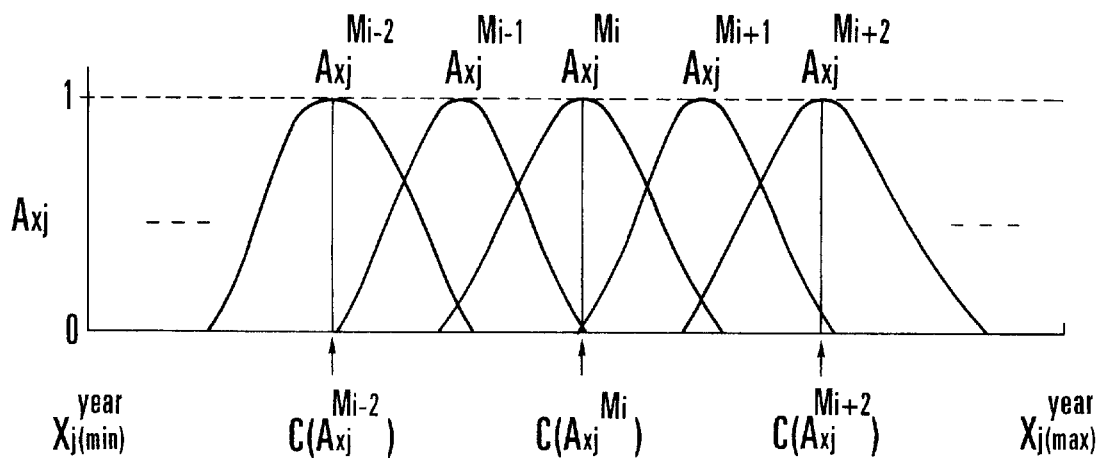
Figure 12:
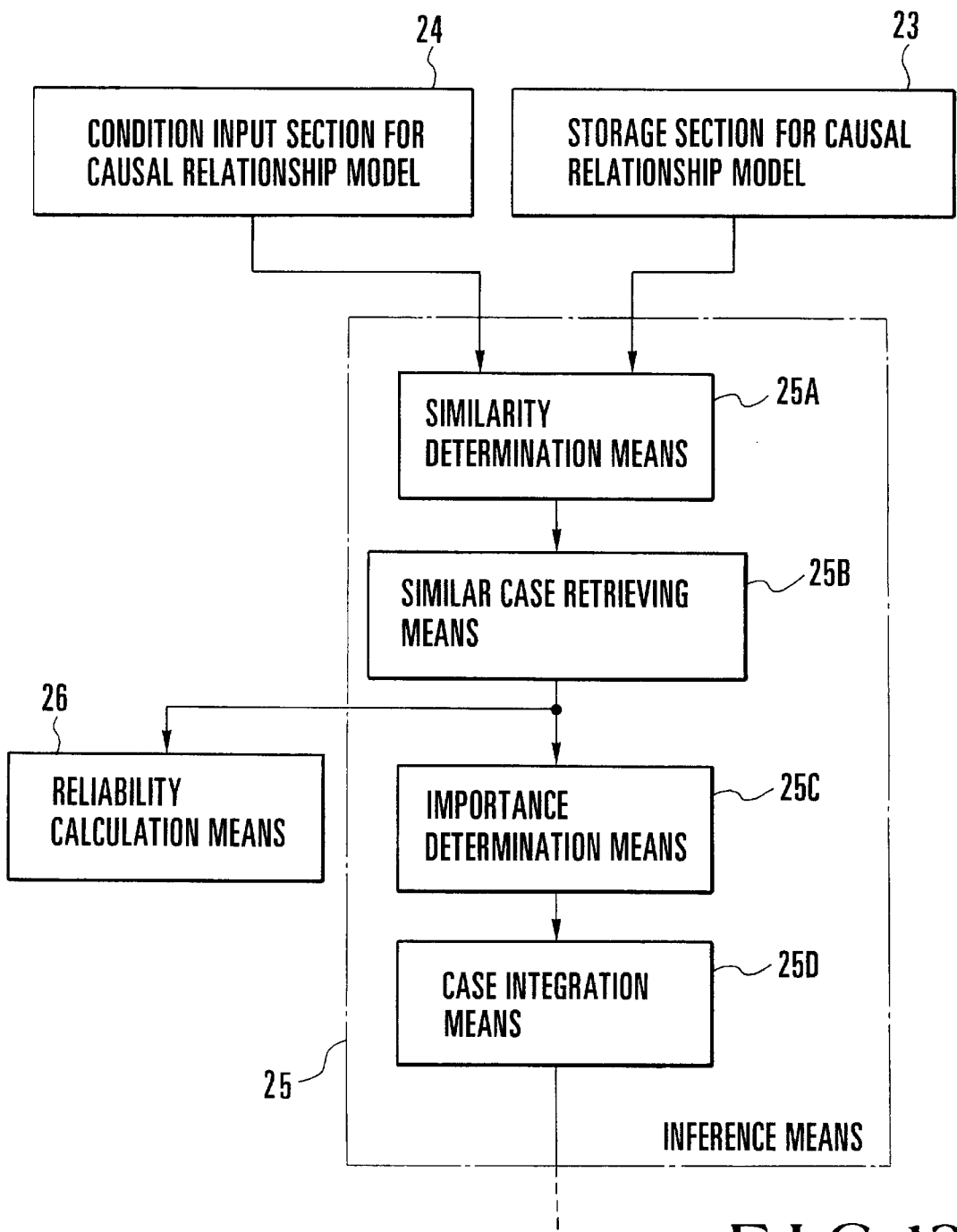
Figure 13:
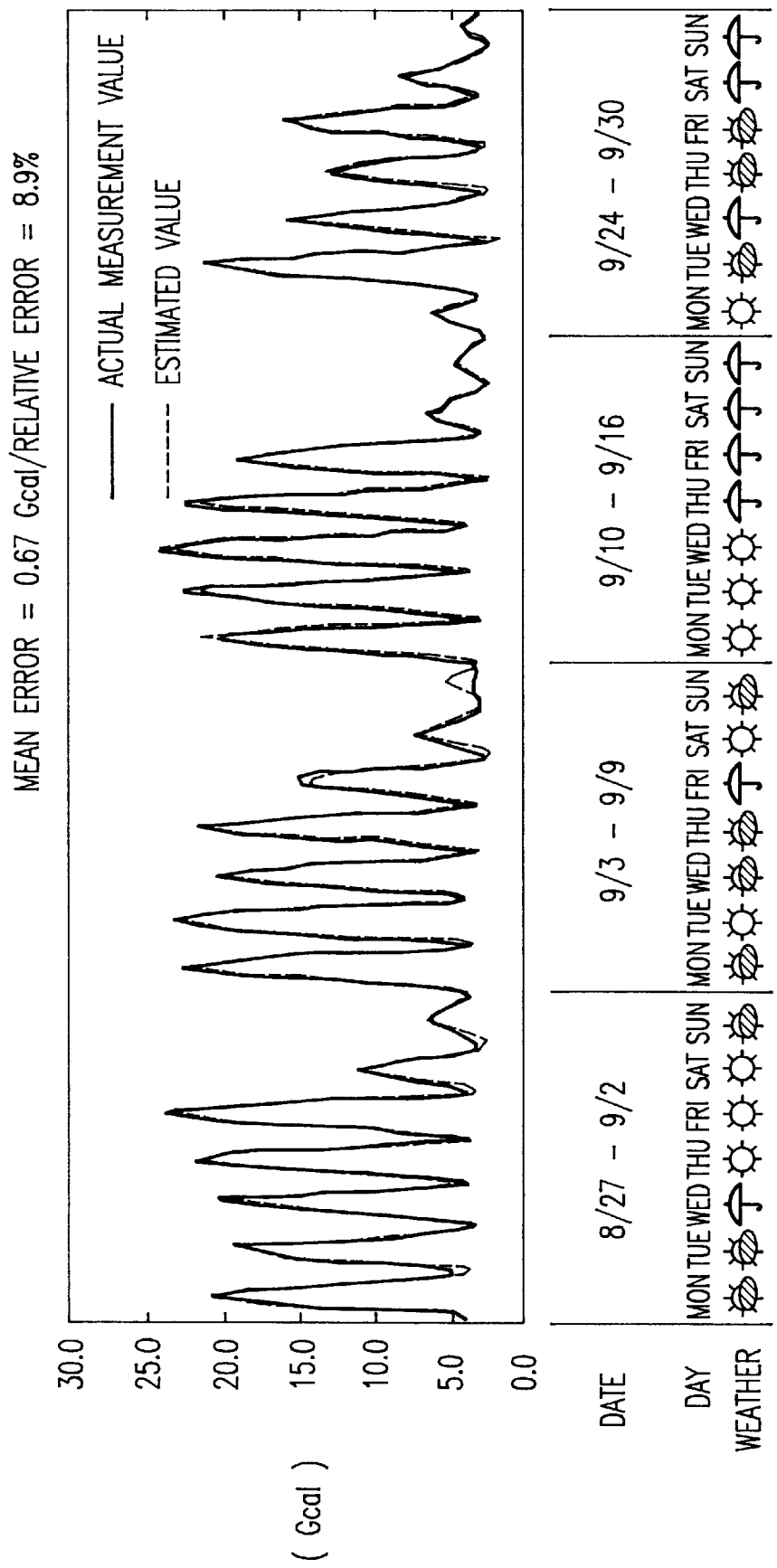
Figure 14A:
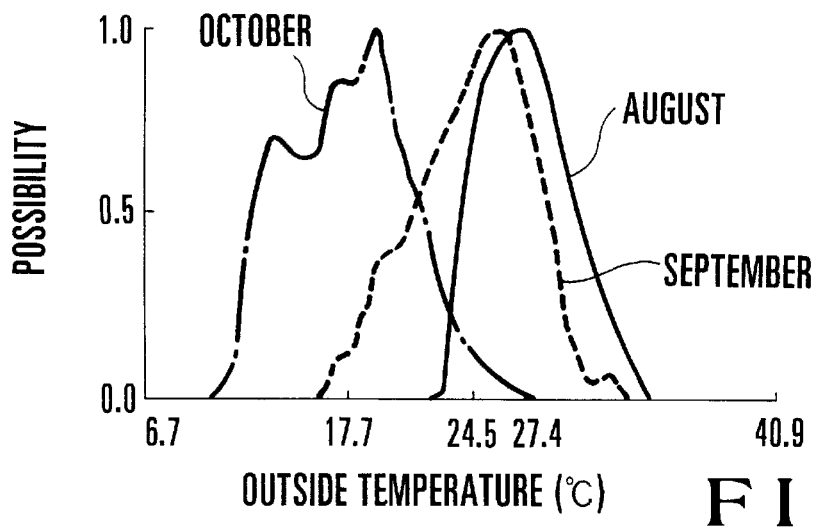
Figure 14B:
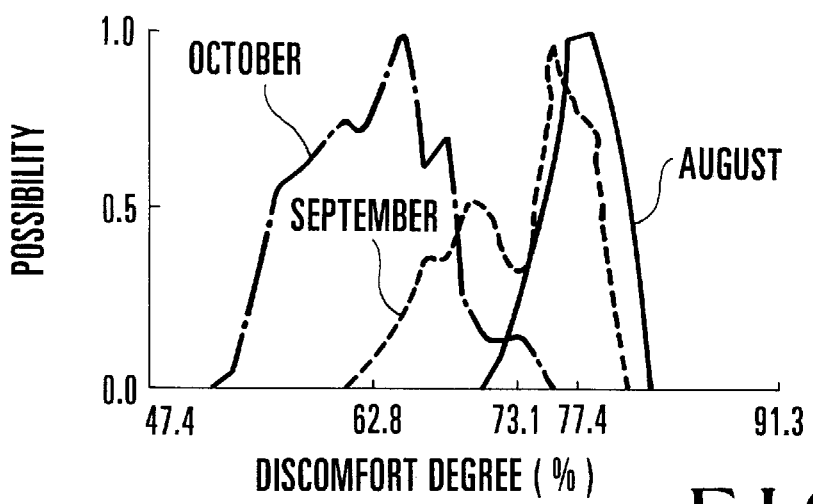
Figure 14C:
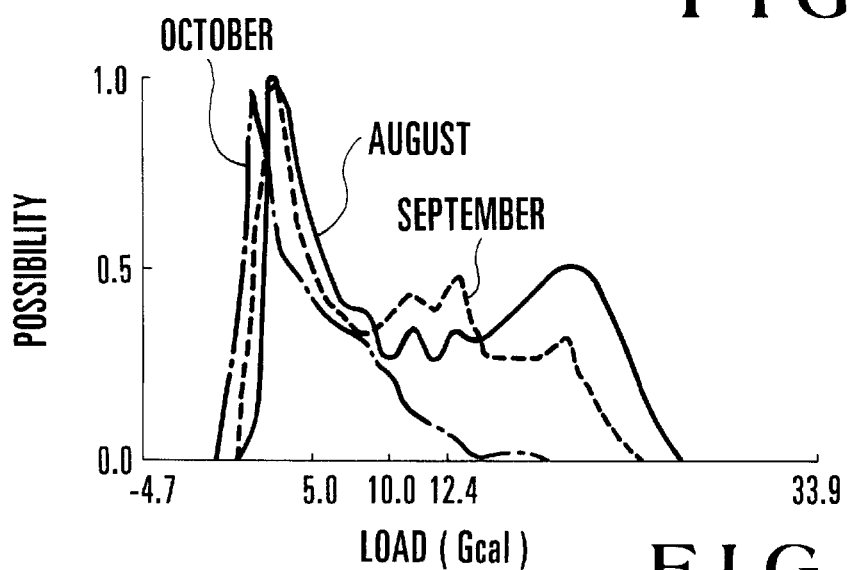
Figure 15:
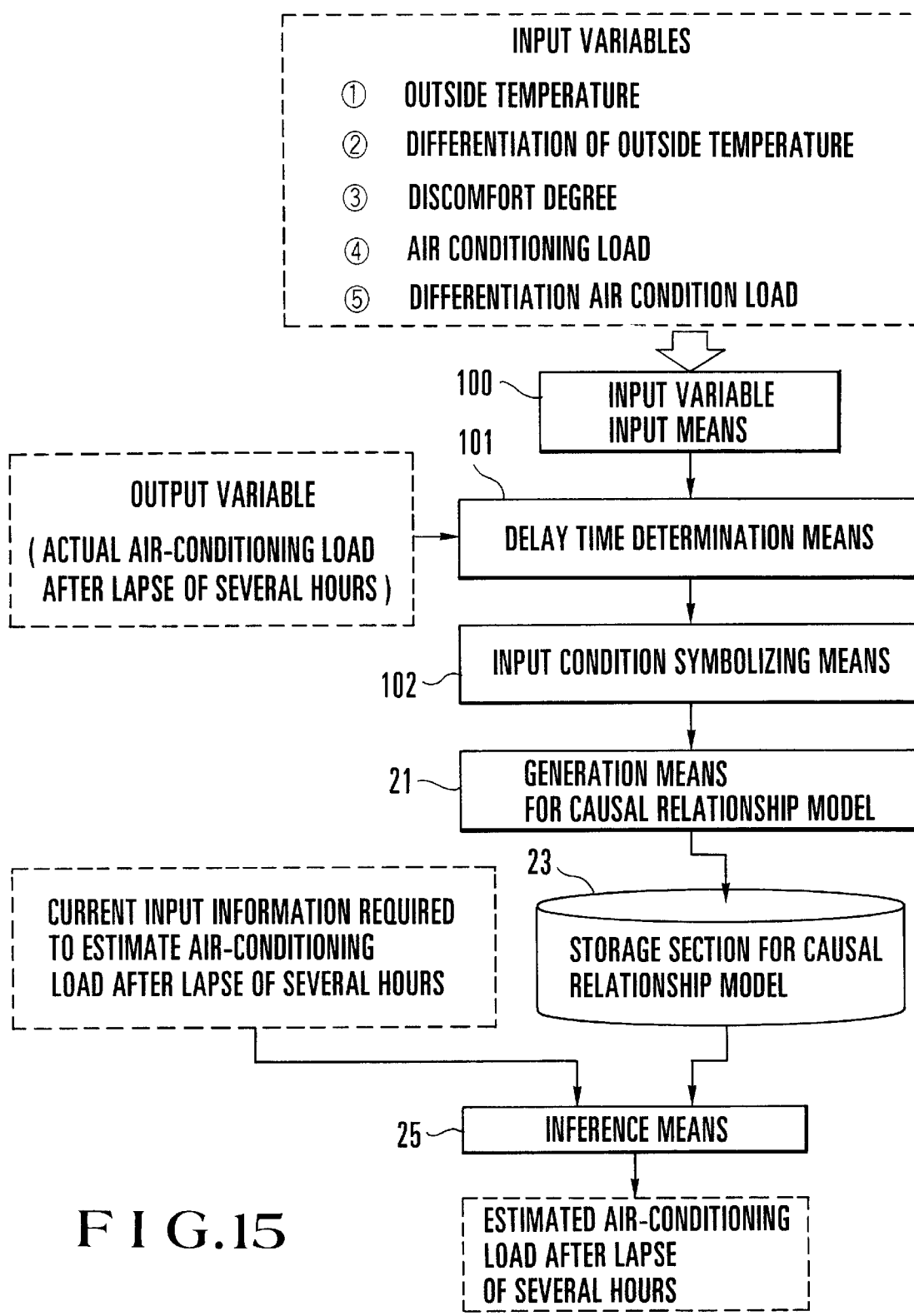
Figure 16A:
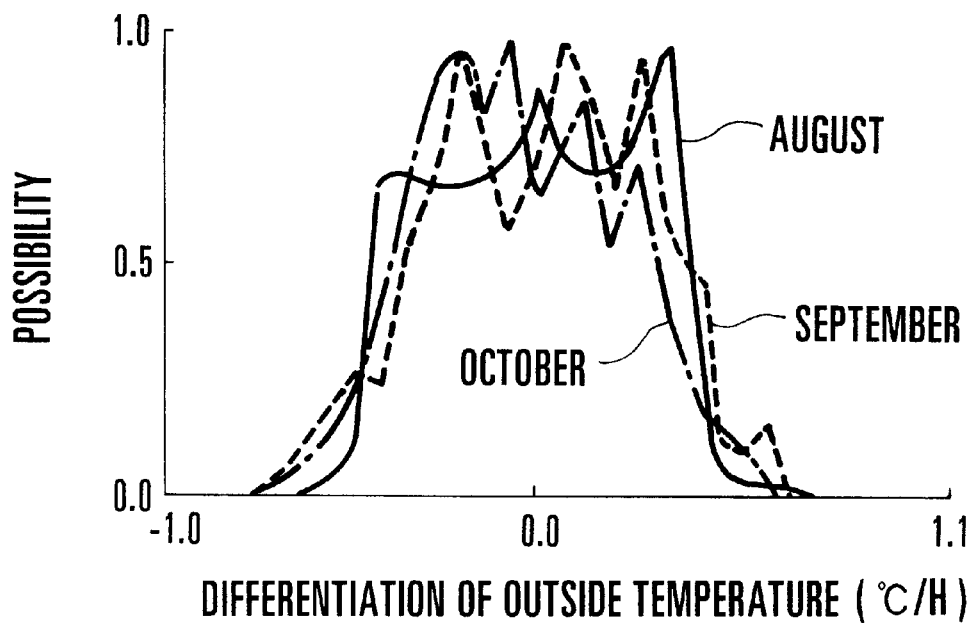
Figure 16B:
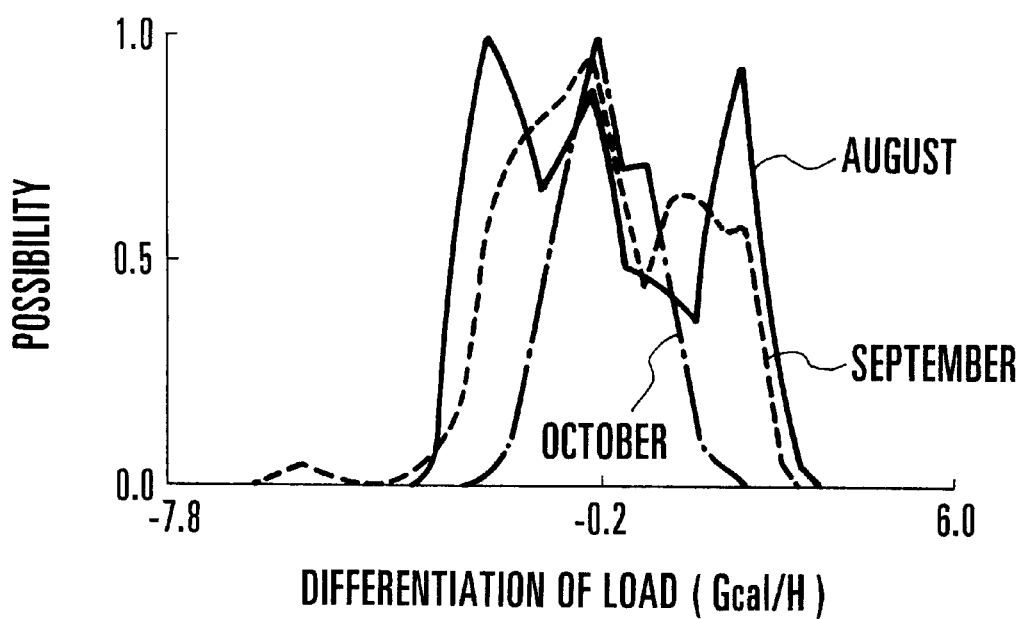
Figure 17:
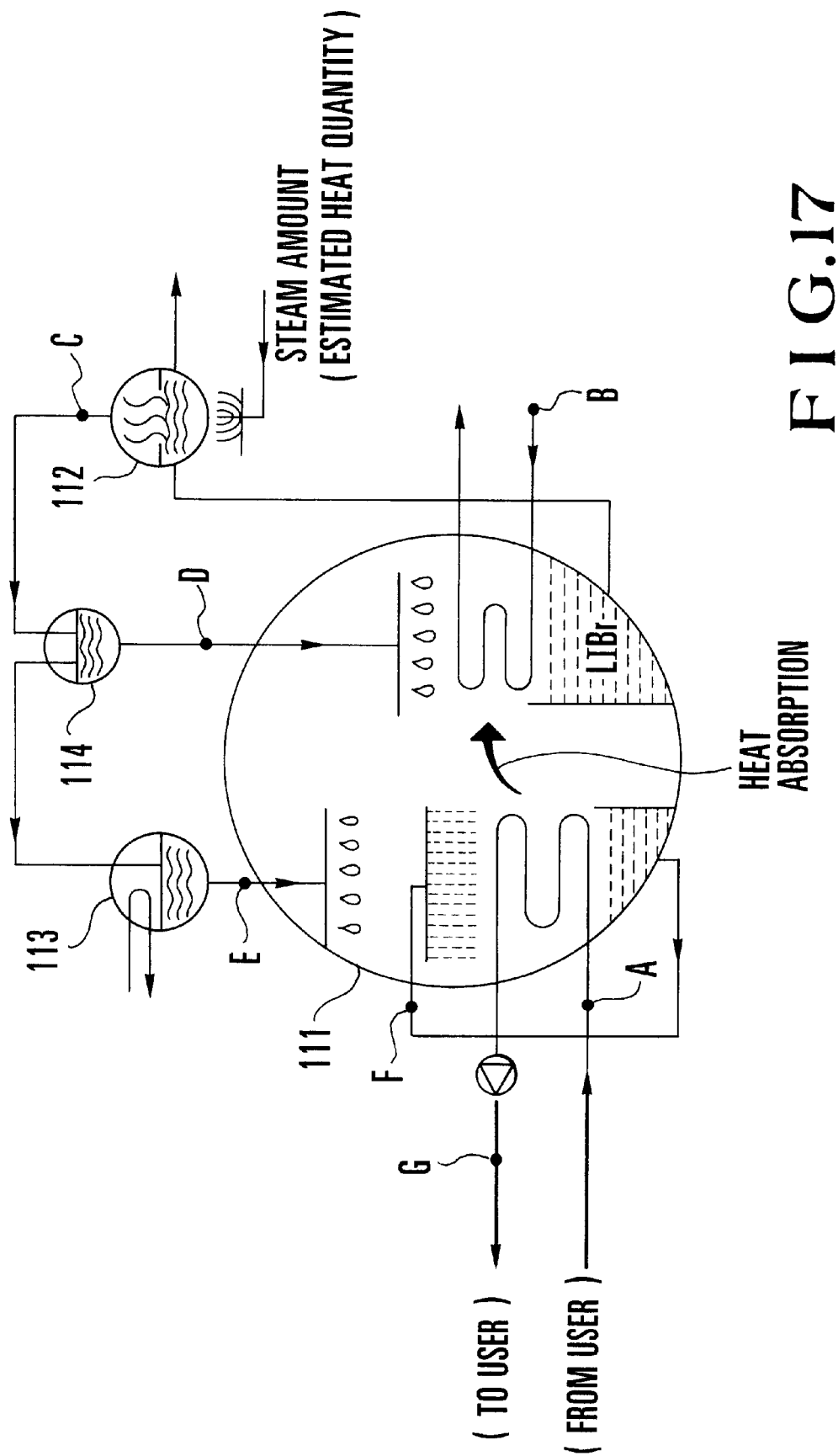
Figure 18:
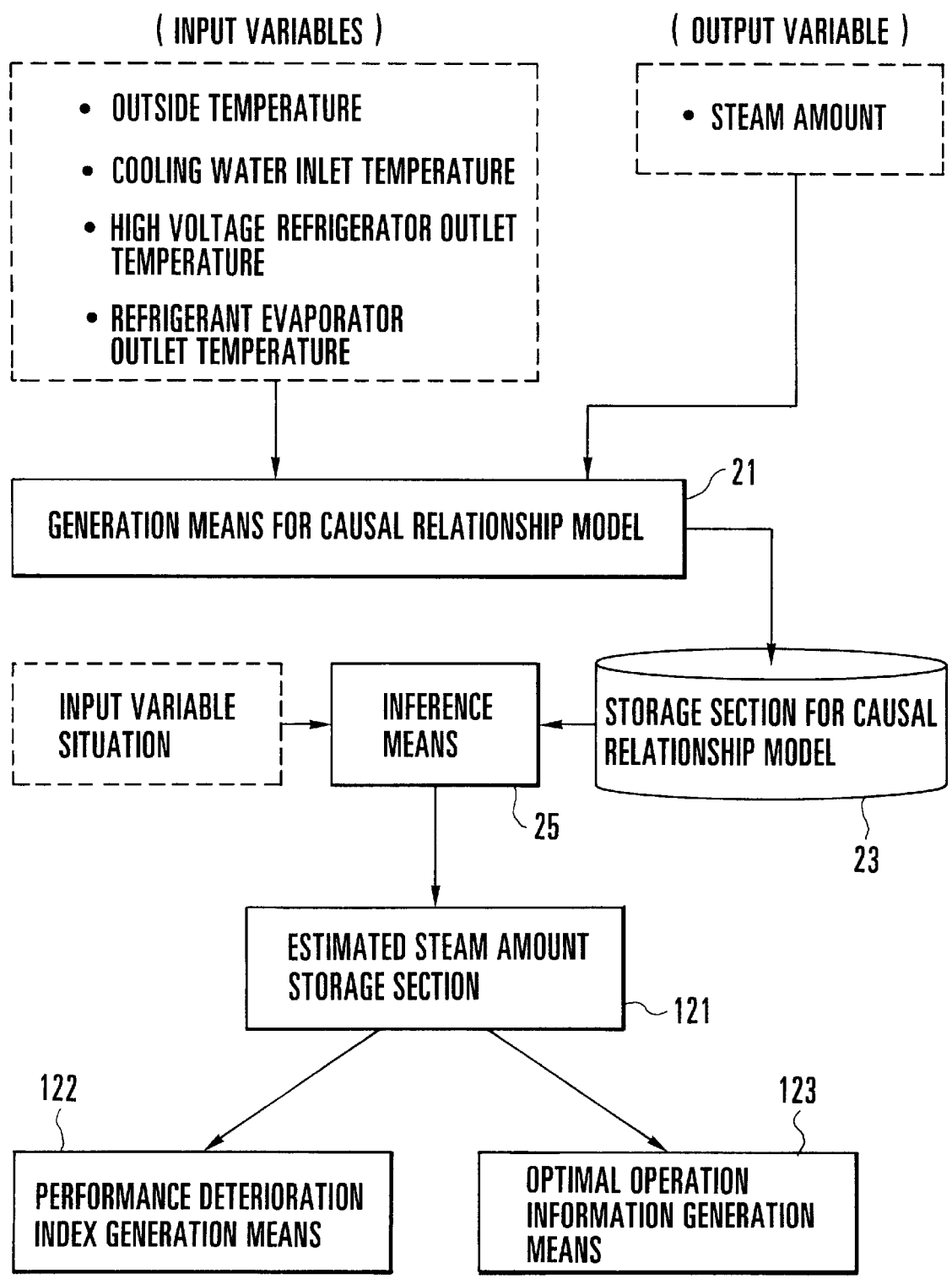
Figure 21:
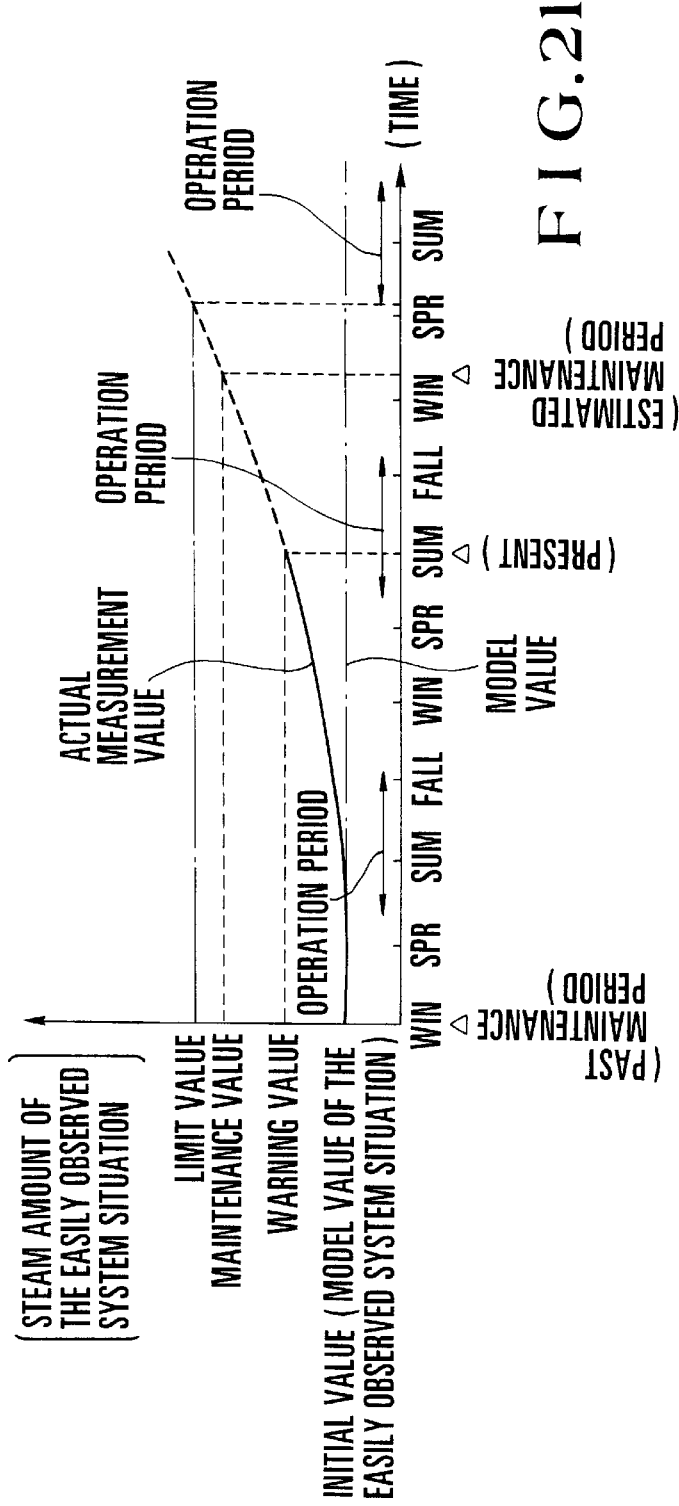
Figure 22:
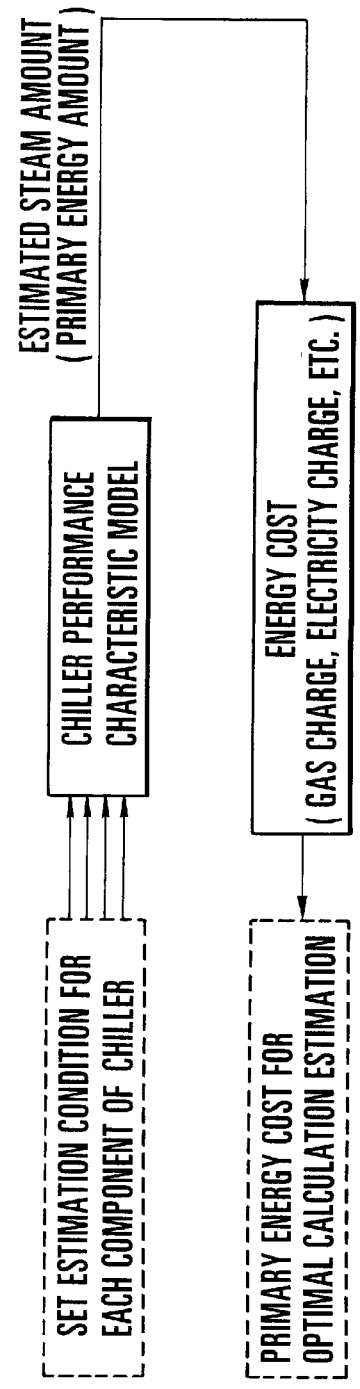
Figure 23A:
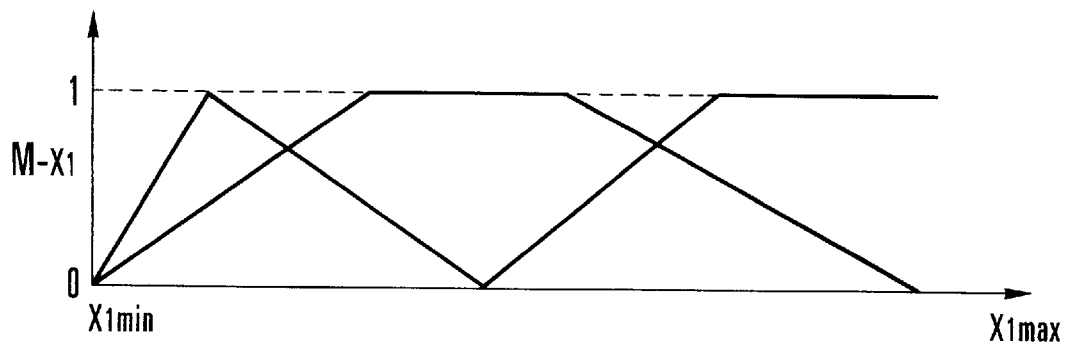
Figure 23B:
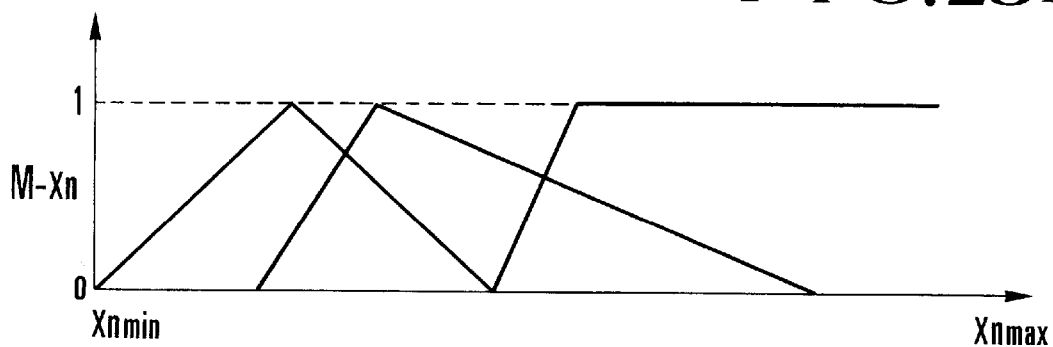
Figure 24:
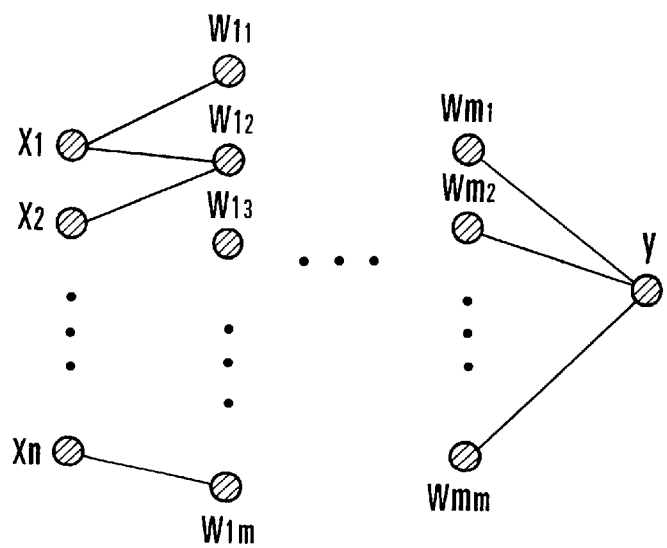

FIGS. 5, 5A, and 5B are block diagrams showing an embodiment of the state estimating apparatus of the present invention;

FIG. 6 is a chart showing the state of a monthly range or a yearly range of each input/output variable in an automatic recognition model generator in the state estimating apparatus;

FIG. 7 is a chart showing an example of how a yearly range of input/output variables in each month is divided in the automatic recognition model generator;

FIG. 8 is a chart showing the distribution of input/output variables in each month in the automatic recognition model generator;

FIG. 9 is a chart showing an example of how the distribution of input/output variables in each month is normalized in the automatic recognition model generator;

FIG. 10 is a chart showing the distribution of membership functions in respective months in the automatic recognition model generator;

FIG. 11 is a chart showing the mean values of distribution of the membership functions in the respective months in the automatic recognition model generator;

FIG. 12 is a block diagram showing an inference means constituting the inference unit;

FIG. 13 is a chart showing a state of an estimation result in the state estimating apparatus;

FIGS. 14A to 14C are graphs showing states of input/output variables used in the state estimating apparatus;

FIG. 15 is a block diagram showing an apparatus according to the second embodiment of the present invention;

FIGS. 16A and 16B are graphs showing states of input/output variables used in the apparatus of the second embodiment;

FIG. 17 is a block diagram showing a chiller;

FIG. 18 is a block diagram showing an apparatus according to the third embodiment of the present invention;

FIG. 19 is a graph showing an estimation result based on a performance deterioration diagnosis model used in the apparatus of the third embodiment;

FIG. 20 is a graph showing an estimation result based on an optimal operation information model used in the apparatus of the third embodiment;

FIG. 21 is a graph showing a state in which a performance deterioration index is generated by a performance deterioration index generation means constituting the apparatus of the third embodiment;

FIG. 22 is block diagram showing a state in which optimal operation information is generated by an optimal operation information generation means constituting the apparatus of the third embodiment;

FIGS. 23($a$) and 23($b$) are graphs showing states of membership functions used in a conventional fuzzy model; and FIG. 24 is a view showing the arrangement of a conventional neural network.

DESCRIPTION OF THE PREFERRED EMBODIMENTS

An embodiment of the present invention will be described next with reference to the accompanying drawings.

An outline of a state estimating apparatus of this embodiment will be described prior to a description of the details. The state estimating apparatus of the embodiment estimates the output state of a system designed to generate one output data as an output result of a plurality of input data, on the basis of the plurality of input data. In this case, each input/output data handled in the apparatus is time series data which continuously changes, and input and output data have an implicit relationship which continuously changes. These past input and output data are stored as recorded case data.

When new input datum is supplied, the output state of the system is inferred from the recorded case data. In order to facilitate such inference, the recorded data is stored in a memory according to a simple form.

Figure 1:
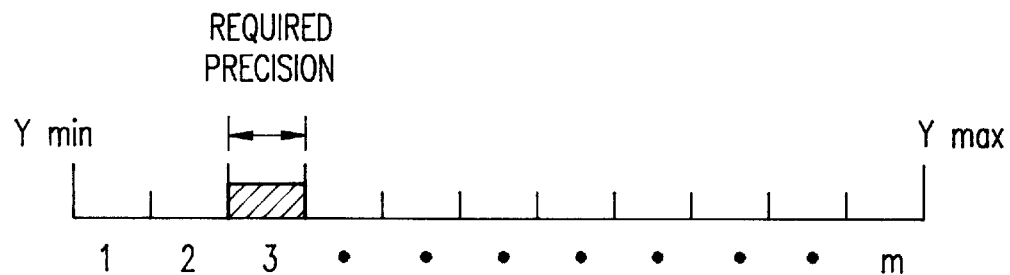
FIG. 1 is a chart for explaining the relationship between the estimation precision of output data and the division number of output data used in an inference unit of a state estimating apparatus.

In this case, as shown in FIG. 1, when the maximum and minimum values of output data of recorded cases are represented by Ymax and Ymin, and the precision of the output data is defined, the total range of the maximum and minimum values of the output data is divided by a division number m in accordance with a required precision.

Quantization of an input space is performed by using this division number m. If some input variables have a high correlation with an output, the range of the maximum and minimum values of each input variable is divided. If no such input variables are present, the input space is divided into m portions, and the input space is further divided with reference to m until the distribution of output values with respect to the same input event falls within the required precision of an output.

Figure 2:
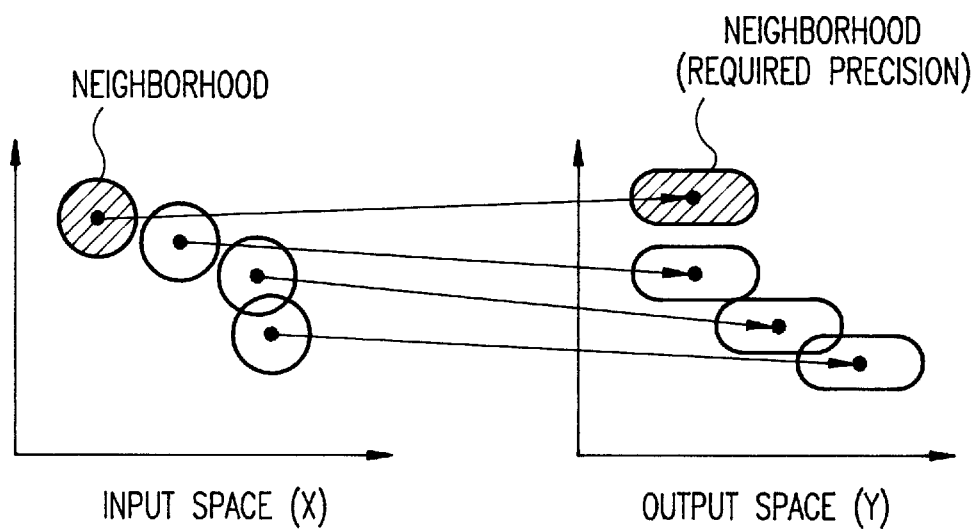
FIG. 2 is a chart for explaining the concept of topology introduced into the inference unit.

In this case, if each input/output data is time series data, and the concept of continuous mapping of topology is applied to the relationship between the input and output data, a neighborhood of the input space where the input data exist can be determined on the basis of a neighborhood of the output space where the output data satisfying the required precision exists, as shown in FIG. 2.

Figure 3:
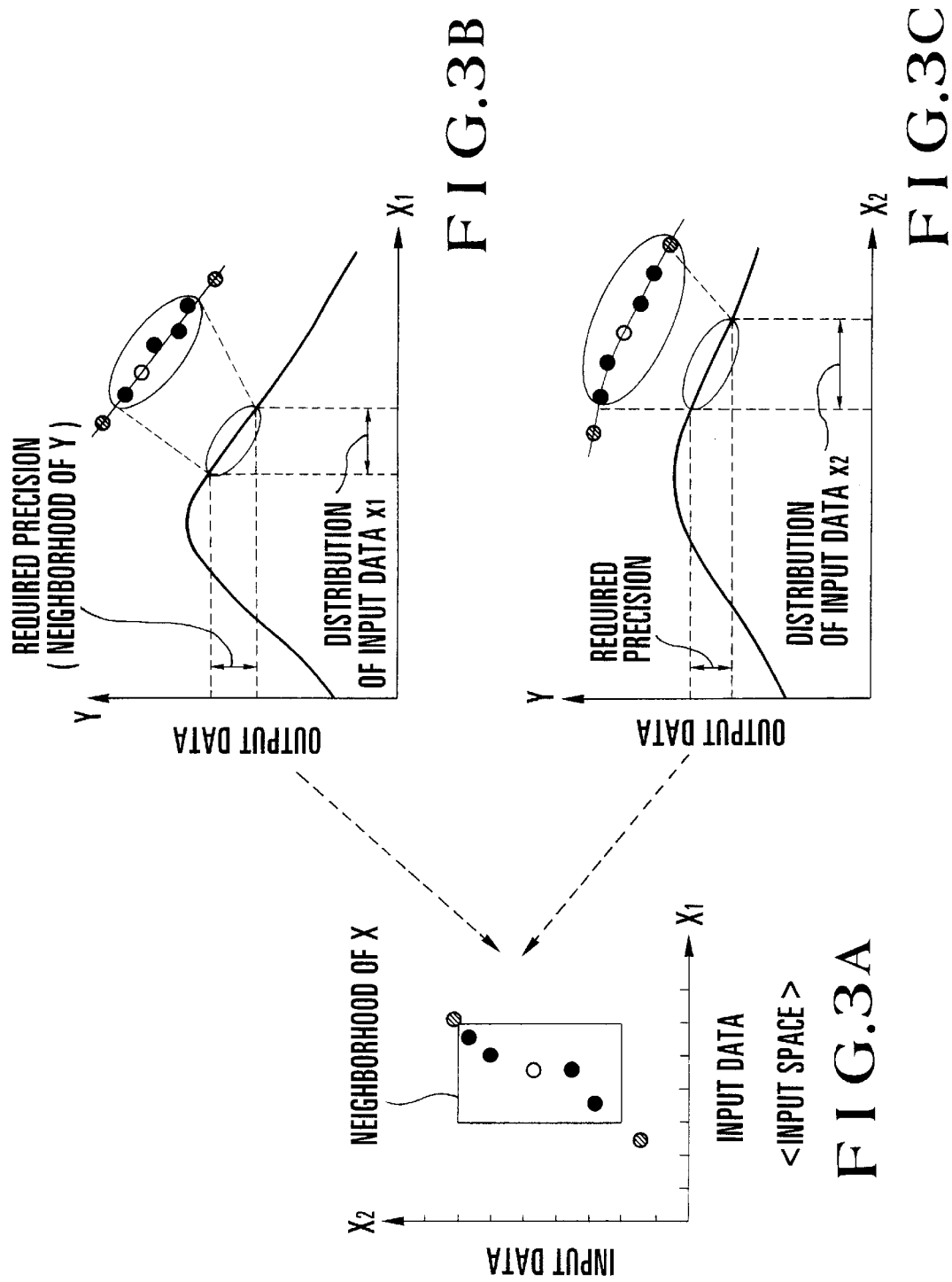
FIGS. 3A to 3C are graphs for explaining the determination of the neighborhood for input space the inference principle of the inference unit.

When, therefore, a given required precision range of output data divided by the division number m is plotted along the Y axis, and input data x1, of a plurality of input data of recorded cases, is plotted along the X1 axis, the distribution of the input data x1 corresponding to the required precision of output data is determined, as shown in FIG. 3B. Similarly, the distribution of input data x2 corresponding to the same required precision range of output data can be set along the X2 axis, as shown in FIG. 3C.

When statistical processing is performed with respect to neighborhoods of the input spaces respectively mapped on the X1 and X2 axes, the required precision range of output data can be expressed as one region statistically processed in the divided input space, as shown in FIG. 3A.

Figure 4:
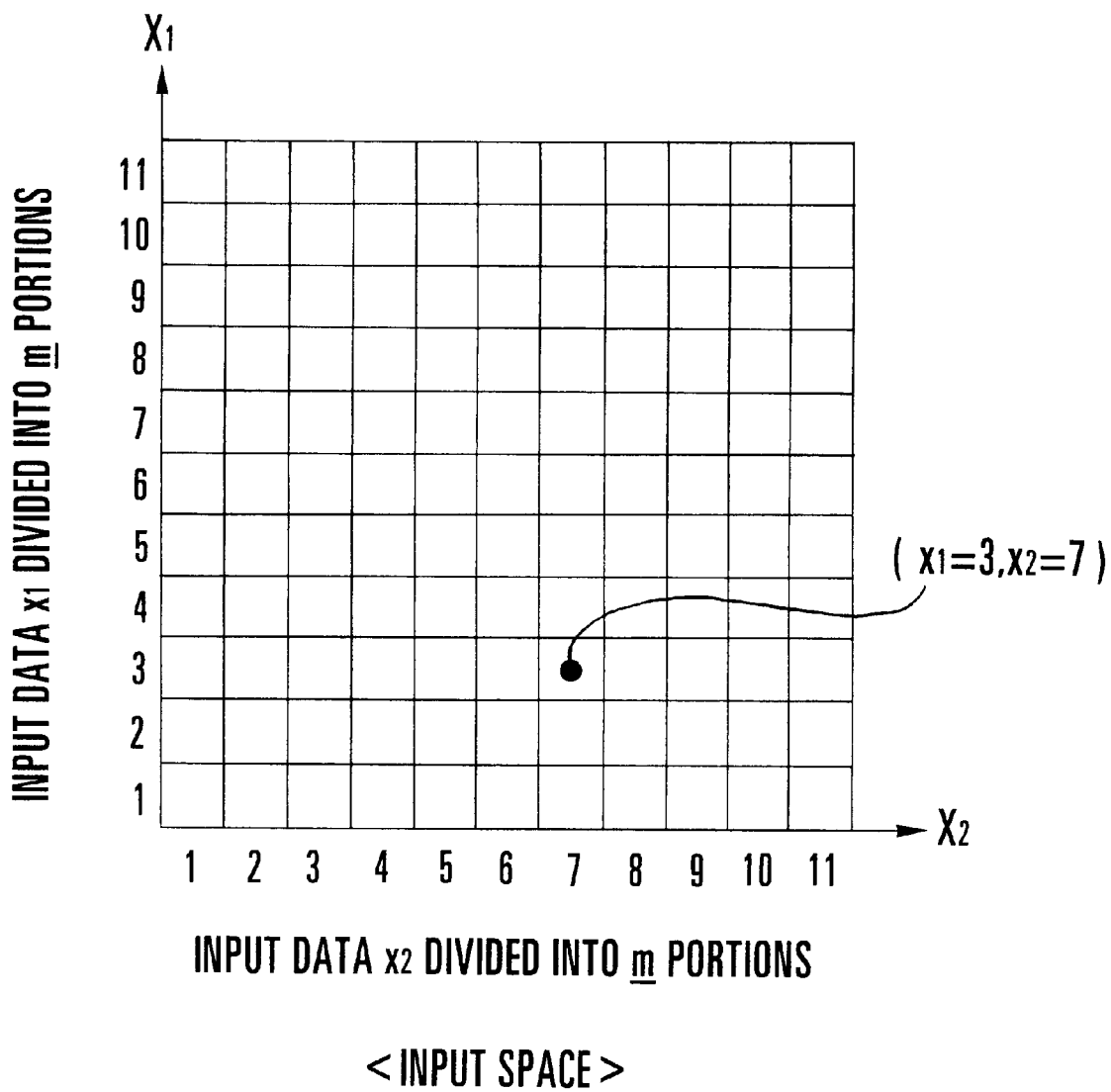
FIG. 4 is a graph showing case data recorded in an input space.

Case data is recorded in the input space divided in this manner, as shown in FIG. 4.

In this case, if input data x1 and x2 are 3 and 7, respectively, and the input space is divided into m (m=11) portions, the input data can be expressed as an m-odic number (base-11 number). Therefore, the input data can be expressed as one number as follows:

$$3 \times 11 + 7 = 40$$

This number "40" expressed as a base-m number is expressed as an event number in the divided input space with respect to the required precision of output data. If output data is generated N times by input data 3 and 7 (40) indicated by this event number, a number N of times of occurrence of the output data, the mean value of the output data, and the mean value of change amounts of the output data are stored in a memory together with the event number in correspondence with each other.

A causal relationship model indicating the causal relationship between input and output data is generated from the recorded case data in this manner, and is stored in the memory.

When new input data is given, the value of output data corresponding to this input data is inferred on the basis of the above-mentioned causal relationship model.

More specifically, this input data is converted into an m-odic number, and a required number ((n+1) in an n-input 1-output scheme) of similar case data similar to the input data are extracted by zooming up regions near the input space by the number of times required for inference. The similarity between the new input data and the extracted similar input case is determined on the basis of a reference value (the degree of zooming up), and the importances of the (n+1) similar cases are calculated from a topological distance based on the following equation (10). The value of output data with respect to the new input data is estimated, as indicated by equation (12) (to be described later), on the basis of the mean value of the output data with respect to the (n+1) similar cases and the mean value of change amounts of the output data.

When the value of output data is estimated from new input data, estimation is performed on the basis of a causal relationship model formed from past case.

The state estimating apparatus of the embodiment can also perform inference by using a fuzzy recognition model formed from past case data.

When input data is quantized in accordance with required precision, of output data, determined by past case data stored in advance, the quantization number for this quantization which exceeds a predetermined value makes it difficult to perform inference. For this reason, case data is divided by a predetermined reference value (e.g., in units of months) to be classified.

Subsequently, quantization is performed with respect to the overall range of the respective variables of the past case data, and the number of times of occurrence of each classified case data is calculated for each quantization number. Normalization is performed with the maximum value of the calculated values, and a possibility distribution (membership function) is generated for each month.

In order to clearly discriminate each monthly possibility distribution generated for each variable from other monthly possibility distributions, i.e., to check whether each possibility distribution can be used, variables used for discrimination are determined by checking whether reference values (mean values of distribution) are uniformly distributed. In addition, this possibility distribution may be displayed to allow an operator to select it. Subsequently, output data with respect to input data is estimated by using a recognition model having a possibility distribution of the variables determined as usable variables and a causal relationship model of each type.

That is, when new input data is input, the possibility of attribution which indicates a specific type of causal relationship model to which the new input data belongs is determined on the basis of a recognition model based on the possibility distribution determined in the above-described manner. The inference value of output data of each type whose possibility of attribution is determined is obtained by using the above-described causal relationship model. In additions the possibility of attribution of each recognition model and the inference value of a causal relationship model of each type are integrated to obtain an overall output inference value.

The present invention will be described in detail below with reference to the accompanying drawings.

FIG. 5 shows an embodiment of the state estimating apparatus of the present invention. For example, this apparatus is applied to a distinct heating/cooling (DHC) system to estimate its air conditioning load.

Referring to FIGS. 5, 5A, and 5B, reference numeral 1 denotes a storage unit for storing case data such as outside temperatures and discomfort degrees observed hourly in the past; 2, a data classification section for classifying the past case data for each month; and 10, an automatic recognition model generator for generating a recognition model from the case data for each month. When new case data is input, the automatic recognition model generator 10 recognizes the possibility of attribution of the new input case data with respect to each month on the basis of the recognition model, Reference numeral 20 denotes an inference unit for generating a causal relationship model of each month from the case data for each month. When new case data is input, the inference unit 20 performs inference on the basis of this causal relationship model, and unit 26 calculates its reliability. Reference numeral 30 denotes an estimated load value display section; and 50, a reliability display section.

The automatic recognition model generator 10 is constituted by a recognition model generation means 11, a recognition model learning means 12, a recognition model storage section 13, a recognition model situation input means 14, a possibility-of-attribution recognition means 15, and a final estimated value determination means 16.

The recognition model generation means 11 extracts factors for recognition from past case data, and generates a recognition model from the extracted factors. The recognition model learning means 12 learns newly input case data and updates the recognition model. The recognition model storage section 13 stores the recognition model.

Upon reception of the new case data from the recognition model situation input means 14, the possibility-of-attribution recognition means 15 recognizes the possibility of attribution to each factor on the basis of the recognition model stored in the recognition model storage section 13. The final estimated value determination means 16 calculates the weighted mean of this recognition result and the inference result obtained by the inference unit 20, and outputs the resultant value as an final estimated load value.

The inference unit 20 is constituted by a generation means 21 for a causal relationship model, a learning means 22 for a causal relationship model, a storage section 23 for a causal relationship model, a condition input section 24 for a causal relationship model, an inference means 25, and a reliability calculation means 26.

The generation means 21 for a causal relationship model generates a model of a causal relationship between past case data, e.g., input factors such as an outside temperature, and a heat load as a result obtained several hours after the input of the case data. The learning means 22 for a causal relationship model learns newly input case data and updates the causal relationship model. The storage section 23 for a causal relationship model stores the causal relationship model.

Upon reception of the new case data from the condition input section 24 for a causal relationship model, the inference means 25 performs inference with respect to the new case data on the basis of the causal relationship model stored in the storage section 23 for a causal relationship model. The final estimated value determination means 16 integrates this inference result and the recognition result obtained by the automatic recognition model generator 10, and outputs the resultant value to the estimated load value display section 30 to display an estimated value. The inference means 25 also supplies the inference result to the reliability calculation means 26 to cause it to perform a calculation of reliability, thus causing the reliability display section 50 to display the calculation result.

In inferring new case data from past case data (recorded case data), the inference means 25 performs inference on the basis of the above-mentioned topology.

The functions of the data classification section 2 and of the recognition model generation means 11 and the possibility-of-attribution recognition means 15 constituting the automatic recognition model generator 10 will be described in detail next with reference to FIGS. 6 to 11.

Assume that input variables such as an outside temperature and a discomfort degree are represented by $X_i$ (i=1, ..., n), and an output variable such as a heat load obtained several hours after the input of the input variables is represented by y, and that there is a causal relationship model determined by combinations of input and output variables and used yearly. When a model, e.g., a causal relationship model with respect to a yearly range of input and output variables, is to be formed, a complicated input/output space having very large quantization number is formed. For this reason, a causal relationship model for each month is formed by a known modeling method, and each model is represented by $M_i$ (i=1, ..., 12). That is, a unit of month is set as a classification criterion used for data classification performed by the data classification section 2, and is used as a classification criterion for classifying states in a year.

That is, a causal relationship model in each variable range is formed with respect to combinations of input variables for each month in accordance with the range defined by expression (3).

$$Xj \rightarrow [x_{j(min)}^{Mi}, x_{j(max)}^{Mi}] (j=1, \ldots, n), (i=1, \ldots, 12) \quad (3)$$

A yearly range with respect to each input variable is determined according to expression (4).

$$Xj \rightarrow \left[ \min_{i=1}^{12} \{x_{j(min)}^{Mi}\}, \max_{i=1}^{12} \{x_j(max)^{Mi}\} \right] \quad (4)$$

$$\rightarrow [x_{j(min)}^{year}, x_{j(max)}^{year}]$$

FIG. 6 shows the condition of this yearly range.

In order to perform identification, a membership function for input variable is formed. Prior to this operation, division (quantization) is performed with respect to the yearly range of each input variable is performed to divide the range into m portions, as shown in FIG. 7.

The number of monthly data of each input variable which belong to a specific digit of the range divided into the m portions is calculated. As a result of this calculation, input data, e.g., outside temperatures or discomfort degrees, have a distribution such as the one shown in FIG. 8.

Subsequently, the possibility distribution of the input data is calculated. In order to use the calculated possibility distribution as a membership function, the data distribution in each month is normalized with the maximum value (maxNO. of i) of data of the data distribution in each month such as the one shown in FIG. 8. As a result, a membership function $A_{xj}$ shown in FIG. 9 is obtained.

In this manner, membership functions for the respective recognition models are determined, as shown in FIG. 10. When the membership functions are determined, variables for making a hierarchical structure are selected to extract factors for characterizing the respective recognition models.

More specifically, of variables $X_j$ (j=1, ..., n), variables which can identify the characteristics of the recognition models for the respective months are used to perform identification. In this case, a mean value $C(A_{xj}^{Mi})$ of distribution of the membership function for a given month shown in FIG. 11 is calculated first. The distances between this calculated value and mean values $C(A_{xj}^{M-2})$ and $C(A_{xj}^{M+2})$ of distribution of the membership functions for the months two months before and after the given month are calculated. If the calculated distance exceeds a given threshold value q (i.e., the data are uniformly distributed) with respect to the yearly range according to inequality (5), the distance is automatically selected as the above-mentioned identification variable. Alternatively, the distribution of such membership functions may be displayed to inform a user of such information, thus allowing the user to select an identification variable easily.

$$\frac{|C(A_{xj}^{Mi}) - C(A_{xj}^{Mi+2})|}{X_{j(\max)}^{year} - X_{j(\min)}^{year}} > q \tag{5}$$

In selecting this identification variable, in the embodiment, the distances between the mean value of distribution of the membership function for a given month and the mean values of distribution of the membership functions for the months two months before and after the given month are calculated, instead of the distances with respect to the months one month before and after the given month. Such calculations are performed to make the boundaries between the months ambiguous. In general, an identification variable may be set while the distances between the respective mean values $C(A_{xj}^{Mi})$ may be set larger than a given threshold value q'.

The number of membership functions defined with respect a given range is counted, and the number is represented by N. When the count value N of membership functions and the threshold value a have a relationship satisfying equation (6), these membership functions are set at positions where they can be identified, $$q = \frac{1}{N+1} \tag{6}$$

In this manner, factors for characterizing causal relationship models for the respective months are extracted by the recognition model generation means 11.

With regard to new input data, the possibility indicating of attribution a specific month to which the data belongs with the highest possibility is recognized by the possibility-of-attribution recognition means 15.

Assume that the above-mentioned identification variable is represented by $X_i'$ ($X_i' \subset X_i$; i=1', ..., n'). In this case, if input data Xi(t) (i=1, ..., n) is given, a possibility Poss(Mi) of attribution with respect to each month is determined on the basis of equation (7).

$$\text{Poss}(Mi) = \text{Product}[A_{x1}^{Mi}(x1'(t)), \ldots, A_{xn}^{Mi}(xn'(t))] \tag{7}$$

Identification is, therefore, performed by using the identification variable $X_i'$ (i=1, ..., n').

Subsequently, a final estimated value is determined by the possibility of attribution determined in this manner.

That is, estimated values $y(t)_{Mi}$ (i=1, ..., 12) are obtained with respect to input data Xi(t) (i=1, ..., n) by using the monthly models formed in advance. With this operation, an estimated value y(t) is calculated according to equation (8), and the estimated value of an overall model obtained by integrating the respective causal relationship models.

$$y(t) = \frac{\sum_{i=1}^{12} Poss(Mi) y(t)^{Mi}}{\sum_{i=1}^{12} Poss(Mi)} \tag{8}$$

In this manner, a model describing the state of a complicated input/output relationship can be easily formed automatically or at the discretion of the user. Therefore, the number of steps in forming a model can be reduced. In addition, since complicated input/output relationships can be classified, the description of a model can be improved.

More specifically, for example, with regard to monthly models as models on the lowermost layer of an yearly model, since the range of each input/output space is limited to the range of a month, a description of a causal relationship model is only required for the range, improving the precision of a model.

Furthermore, since only the input/output relationship data (input/output variables) of causal relationship models on the lowermost layer are required to be stored in a memory, models can be generated with a small-capacity memory.

Upon reception of new input data, the recognition model learning means 12 performs learning on the basis of the above-mentioned recognition model and updates the recognition model.

The foregoing is the details of the functions of the respective components of the automatic recognition model generator 10 constituting the apparatus of the embodiment. The functions of the generation means 21 for a causal relationship model and the inference means 25 which is constitute the inference unit 20 and of the final estimated value determination means 16 constituting the automatic recognition model generator 10 will be described in detail next.

In the embodiment, the inference means 25 for performing inference on the basis of a topology handles the causal relationship between input factors such as an outside temperature and a discomfort degree and a result obtained several hours after the input of factors, e.g., an indoor temperature. For the sake of descriptive convenience, an indoor temperature will be considered here instead of a complicated phenomenon such as a heat load.

Assume that an input space is represented by X=<x1, x2, ..., xn>, and an output space is represented by Y=<y>. In this case, data which causes events X1(t), X2(t), ..., Xn(t) that happen at time t to produce an output Y(t+α) after the lapse of a time α is inferred. That is, inference is performed with respect to time series data having a relationship expressed by {X1(t), X2(t), ..., Xn(t), Y(t+α)} (t=1, ..., N) as input/output data, with each input/output variable continuously changing.

Before inference is performed by the inference means 25, the generation means 21 for a causal relationship model generates a causal relationship model for input/output data of recorded case data.

First, the generation means 21 for a causal relationship model quantizes an input space to divide it into a finite number of input events, and integrates input/output data belonging to the same input phenomenon to form one case. In this case, the condition if-part of the recorded case data, i.e., input data such as an outside temperature and a discomfort degree, is quantized input data {X1, X2, ..., Xn}. The then-part of the recorded case data, i.e., a temperature after the lapse of the time α, can be represented by a distribution mean value Y of distribution of the indoor temperature data, a number n of times that the same input event occurs, and a mean value $\partial Y/\partial X1, \ldots, \partial Y/\partial Xn$ of distribution of partial differential values (the mean value of output change amounts). That is, a causal relationship model can be expressed by relationship model (sets of input and output data) $\{X1, X2, \ldots, Xn\}, \{Y, n, \partial X/\partial X1, \ldots, \partial Y/\partial Xn\}$.

For example, an outside temperature X1 (°C.) and a discomfort degree X2 (%) are measured as input data, and the maximum values (max) and minimum values (min) of these data at times t (t=1, ..., N) within a given period are respectively obtained as follows:

X1(max)=30.0, X1(min)=20.0
X2(max)=80.0, X2(min)=70.0

In addition, data obtained at time $t=t_1$ is

X1($t_1$)=25.6, X2($t_1$)=78.7

In this case, if a quantization number for quantizing the input space is "10" (the interval between the maximum value and the minimum value is divided into 10 portions), quantized data are expressed by X1=6 and X2=9, and are symbolized as one event expressed by {6, 9}.

If, therefore, an indoor temperature $Y(t_1+\alpha)$ at time $t=t_1+\alpha$ is 25.0, a causal relationship model expressed by {6, 9}→25.0 (notice partial differential values are omitted because of simplification), i.e., {6×10+9=69}→25.5.

If an indoor temperature $Y(t_1+\alpha+1)$=25.5 is obtained, as event at time $t=t_1+1$, with X1($t_1$)=25.8 and X2($t_1$)=78.79, the input event belongs to the same event {6, 9}. Therefore, output events occurring with respect to the same input event can be averaged as follows:

{6, 9}→25.25 [={25.0+25.5}/2 where n=2]

As a result, case data can be compressed, and the capacity of a memory used as a case base can be greatly reduced as compared with the prior art.

Each partial differential value described above is an amount of change in output with respect to an amount of change in each input variable. In addition, in this case, each input/output variable is continuous data. Therefore, this partial differential value $\partial Y/\partial Xi(t)$ can be calculated according to equation (9).

$$\partial Y/\partial Xi(t) = |Xi(t+1) - Xi(t-1)|/\sum_{k=1}^{n}|Xk(t+1) - Xk(t-1)| \times \{Y(t+1) - Y(t-1)\}/\{Xi(t+1) = Xi(t-1)\} \quad (9)$$

After the causal relationship model for the recorded case data is generated by the generation means 21 for a causal relationship model in this manner, the inference means 25 performs inference with respect to new case data on the basis of the causal relationship model.

Assume that the if-part of the new case data is $\{Xi^*\}$ (i=1, 2, ..., n) and the causal relationship model generated by the generation means 21 for a causal relationship model is $\{Xi, Y, n, \partial Y/\partial Xi\}$ (i=1, 2, ..., n). In this case, the if-part of the new case data is quantized and symbolized in the above-described manner at the same time when it is input.

FIG. 12 shows the inference means 25. The inference means 25 is constituted by a similarity determination means 25A, a similar case retrieving means 25B, an importance determination means 25C, and a case integration means 25D.

When inference is to be performed with respect to new case data, the similarity of the if-part of recorded case data with respect to the new case data is determined (the similarity corresponds to the concept of a neighborhood system in the above-described topology). In this case, the similarity of the recorded case data with respect to the new case data is determined by the following definitions:

similarity 0: $|Xi^* - Xi| = 0 \quad (i=1, 2, \ldots, n)$ similarity 1: $|Xi^* - Xi| \leq q_{Xi} \quad (i=1, 2, \ldots, n)$ similarity 2: $|Xi^* - Xi| \leq q_{Xi} + 1 \quad (i=1, 2, \ldots, n)$ similarity 3: $|Xi^* - Xi| \leq q_{Xi} + 2 \quad (i=1, 2, \ldots, n)$ In this case, $q_{xi}$ is called a neighborhood, which is a digit value determined by the statistical distribution of an if-part Xi of the recorded case data with respect to the allowable precision of a then-part Y of the recorded case data.

Assume that X1 represents an outside temperature; X2, a discomfort degree; and Y, an indoor temperature after the lapse of the time $\alpha$. In this case, when estimation is to be performed such that the difference between the indoor temperature Y and an estimated value is two degrees or less, the output space is quantized such that one digit represents two degrees, similar to the input space. In this case, if the quantization number is "20", for example, statistical processing is performed according to the following steps ① to ③.

① the then-parts (output space) of recorded cases belonging to the same digit, of digits 1 to 20, are acquired to perform clustering in the input space. The distribution of if-parts X1 and X2 of the cases belonging to the same cluster is obtained as the discrete value $qij_{X1}$ and $qij_{X2}$ for i-th digit, j-th cluster. Assume, in this case, that the number of clusters generated at this time is represented by $n_{ci}$.

② Subsequently, the distribution of each cluster of the if-parts X1 and X2 of the cases belonging to digit i of the then-part Y of the recorded case data is calculated as a discrete value. This discrete value is averaged by the number of clusters $n_{ci}$ to obtain digit values $qi_{Xi}$ and $qi_{X2}$, as follows:

$$qi_{x1} = \sum_{j=1}^{n_c} qij_{x1}/n_{ci}, \quad qi_{x2} = \sum_{j=1}^{n_c} qij_{x2}/N_{ci}$$

② The digit values $qi_{Xi}$ and $qi_{X2}$ are averaged according to the following equations:

$$q_{x1} = \sum_{i=1}^{20} qi_{x1}/20, \quad q_{x2} = \sum_{i=1}^{20} qi_{x2}/20$$

Assume that $q_{X1}$=2 and $q_{X2}$=3 are obtained as the closest values. In this case, if the then-part Y of the recorded case data is required to have a precision of one degree or less, $q_{X1}$=1 and $q_{X2}$=2. Therefore, the digit value $q_{Xi}$ varies depending on the required precision.

If the distance between recorded case and new case is smaller than $q_{Xi}$ with respect to the input variable Xi, the topologies of the if-parts of the respective case data are regarded close to each other. In this case, it is regarded that the then-part (output variable) of the new case data is within the required precision with respect to the then-part of the recorded case data.

When new case data is input, and the then-part of the new case data is inferred from recorded case as in the above case, inference is performed on the basis of topologies. For this reason, the state of a system can be estimated without standardizing an input/output relationship in the system. As a result, the above-described drawbacks of the conventional inference apparatus can be eliminated. That is, the following methods and schemes are generalized: ① the method of retrieving case data, ② the recording scheme of case data, ③ determination on the similarity between case data, ④ determination on the importance of case data, and ⑤ the method of correcting case data. Therefore, the state of a system can be easily and accurately estimated in the range of time series data in which a case continuously changes.

When the similarity of the recorded case data with respect to the new case data is obtained in this manner, the similar case retrieving means 25B retrieves a similar case with respect to the new case data from the if-parts of the recorded case data.

More specifically, the similar case retrieving means 25B extracts cases used for inference as similar cases of the if-parts of the recorded case data in the order of decreasing similarities to the new case data. The number of cases used for inference is determined by the dimension of an input/output space. That is, in case of one output for n input, the (n+1)th dimension is set, and the number of cases extracted is (n+1). if the number of recorded case data having the same similarity is larger than the number of cases used for inference, (n+1) cases closest to the new case are extracted.

The importance determination means 25C determines the importance of each similar case with respect to the new case data.

In this case, a topological distance is defined in the input space, and the relationship between the respective case data is considered. For example, a distance L given by equation (10) is introduced.

$$L = \sum_{i=1}^{n} \Phi i \, | Xi^* - Xi | \quad (10)$$

$$\text{for } \Phi i = R_{Xi} \bigg/ \sum_{k=1}^{n} R_{Xk}$$

$$R_{Xi} = \sum_{j=1}^{N} (\{xi\}j - \bar{x})(yj - \bar{y}) \bigg/ \left[ \sum_{j=1}^{N} ((\{xi\}j - \bar{x}))^2 \sum_{j=1}^{N} (yj - \bar{y})^2 \right]^{1/2}$$

(where $\bar{x}$ and $\bar{y}$ are mean values and N is a data count) where $\Phi i$ is the weight of the distance of the variable Xi.

An importance Wj of the m (=n+1) cases used for inference, which are extracted as the similar cases, during inference processing is defined by using equation (11):

$$Wj = \exp(-Lj) \quad (11)$$

$$\left( \text{for } Lj = \sum_{i=1}^{n} \Phi ij \, | Xij^* - Xij |, \, j = 1, \ldots, m \right)$$

By using the m similar cases extracted in this manner, the case integration means 25D calculates a then-part, i.e., an inference value Y* with respect to the new case data Xi* (i=1, 2, . . . , n) according to equation (12):

$$Y^* = \sum_{j=1}^{m} \left[ Wj \left\{ yj + \sum_{i=1}^{n} (\partial Yi / \partial Xij) Lij \right\} \right] \bigg/ \sum_{j=1}^{n} Wj \quad (12)$$

(for $Lij = Xij^* - Xij$)

where Lij is the distance from the input data on a i input variable axis of the jth case, yj is the then-part value of the jth similar recorded case, and $\partial Yi/\partial Xij$ [equation (9)] is the ratio of variation in the then-part value, which variation is caused by the ith variation of the jth similar recorded case.

When an estimated value is obtained by the inference means 25, the reliability calculation means 26 performs an arithmetic operation to determine the reliability of the inference result.

More specifically, the reliability calculation means 26 determines the reliability of the inference conclusion by using the similarities of the similar cases used for inference with respect to the new case data. Assume that the highest similarity, of the similarities of the similar cases used for inference with respect to the new case, is defined as the reliability of the inference result. The inference result whose highest similarity is "1" has reliability "1". In this case, reliability "0" indicates the highest reliability, and the reliability is reduced as the number increases.

Subsequently, the final estimated value determination means 16 calculates the weighted mean of the inference result obtained by the inference means 25 and the result of the possibility of attribution which is obtained by the possibility-of-attribution recognition means 15. The result data is displayed on the estimated load value display section 30. In addition, the reliability calculation result obtained by the reliability calculation means 26 is also displayed on the reliability display section 50.

Note that the learning means 22 for a causal relationship model learns new case data and updates the causal relationship model. Such update processing for the case base is performed according to the following procedure. Note that "*" indicates a new case.

If the number of times of occurrence of previous events in the same if-part is represented by n, the number of occurrence of events is increased by one to set (n+1), and the output mean value Y is represented by (Y×n+Y*)/(n+1). In addition, the partial differential value (mean value of output change amounts) $\partial Y/\partial X1$ is represented by ($\partial Y/\partial X1 \times n + \partial Y/\partial X1$ *)/(n+1).

As a result, the model can be easily updated as compared with the prior art in which the state of a system is expressed by a standard model using several parameters.

FIG. 13 shows a result obtained by performing inference (estimation of an air-conditioning load) on the basis of actual recorded data.

As a model, recorded data obtained by recording data hourly from June to November in 1989 was used. As if-parts of case data, an outside temperature, a discomfort degree, differentiation of outside temperature, differentiation of heat load, and a heat load were used. In addition, as a then-part of the case data, a heat load after the lapse of four hours was used. The case data were classified in units of months, and the case base model for each month was automatically generated by the generation means 21 for a causal relationship model.

In order to recognize the possibility of attribution with respect to each month, the recognition model generation means 11 performed feature extraction for recognition with respect to each if-part of the case data, i.e., from the outside temperature to the heat load. As a result, outside temperatures, discomfort degrees, and heat loads as shown in FIGS. 14(a) to 14(c) were selected, and a possibility-of-attribution recognition model was automatically generated by using these data.

By using these cases (knowledge) in 1989, load estimation during the period from Aug. 27, 1990 to Sep. 30, 1990 was performed by the possibility-of-attribution recognition means 15 and the inference means 25. That is, an experiment was performed to estimate a load (state) occurring after the lapse of four hours with respect to the if-parts of the case data in 1990, i.e., from the outside temperature to the heat load. The reason why this period is selected is that the weather in the period greatly changes (typhoon season), and it is difficult for a conventional estimation model to maintain high estimation precision.

According to this experiment result, the relative error (=|estimation error|/actual measurement value) of the apparatus of the embodiment is 8.9%. Note that the relative error of the conventional model is 15.5%. That is, the estimation precision of the apparatus of the embodiment is about twice as high as that of the conventional model, thus achieving an increase in precision. In addition, the apparatus of the embodiment maintained high precision in spite of the fact that the difference in temperature between September 6 and September 7 was as high as 10 degrees, and there was rain on September 7, i.e., the weather varied greatly. This is because the state on September 6 was similar to the states in June and October, and estimation was performed by using the case in the most suitable state. These pieces of information were obtained from reliability information displayed together with the estimation result.

FIG. 15 shows the second embodiment of the state estimating apparatus of the present invention, and specifically a main part of an air-conditioning load estimating apparatus for estimating the heat load of an air-conditioning system.

Referring to FIG. 15, this air-conditioning load estimating apparatus comprises an input means 100 for inputting input variables as recorded case data, e.g., an outside temperature, a delay time determination means 101, an input condition symbolizing means 102, a generation means 21 for a causal relationship model (described above) to perform input/output relationship modeling, and an inference means 25 (described above).

The air conditioning load estimating apparatus uses the outside temperature change amount and the heat load change amount shown in FIGS. 16A and 16B as input variables (i.e., the if-parts of case data) in addition to the outside temperature, discomfort degree, and the heat load shown in FIGS. 14A–14C, and also uses heat load data occurring after the lapse of several hours as an output variable (the conclusion part of the case data). When a new state occurs, and corresponding input variables are input, the apparatus estimates a heat load after the lapse of several hours.

The delay time determination means 101 receives input variable data of the outside temperature, the discomfort degree, the outside temperature change amount, the heat load, and the heat load change amount as recorded case data, which data are obtained hourly. Upon reception of heat load data as an output variable which actually occurs in the air conditioning system after the lapse of several hours, the delay time determination means 101 determines each input variable data as data a specific time before the time point (as a reference time point) at which the output variable is input. For example, as the outside temperature, a value one hour before the reference time point is determined, and as the discomfort degree data, a value one hour before the reference time point is determined. In this manner, five values are determined as the five input variable data, and the determined input variables are supplied to the input condition symbolizing means 102 together with an output variable.

Upon reception of the data of these input and output variables, the input condition symbolizing means 102 performs symbolization of the input variable data to compress the data in the same manner as described above, and supplies the resultant data to the generation means 21 for a causal relationship model. The generation means 21 for a causal relationship model relates the symbolized input variable data to the symbolized output variable data to generate an input/output relationship model.

Upon reception of new input variables such as an outside temperature, the inference means 25 estimates an air-conditioning load value after the lapse of several hours on the basis of the input/output relationship generated by the generation means 21 for a causal relationship model, and outputs the estimation result.

In this manner, a model for estimating an air-conditioning load after the lapse of several hours is generated in consideration of the respective data, i.e., an outside temperature, an outside temperature change amount, a discomfort degree, a heat load, and a heat load change amount as input factors. With this model, events can be accurately recognized, and hence accurate load estimation can be performed.

As described above, according to the state estimating apparatus of the present invention, since many factors for a state after the lapse of several hours can be considered in the field of control and operation based on state estimation, a complicated phenomenon can be described, and a model suitable for a given state can be automatically selected from classified models. Therefore, high estimation precision can be maintained even in a case wherein great variations occur or the attribute of a state is ambiguous. Especially in the case of estimation of an air-conditioning load, the apparatus is effective with respect to a state such as great variations in weather or a change of season. Consequently, when an operation or control is to be performed on the basis of this estimated value, accurate scheduling or setting of proper parameters can be performed.

More specifically, in air conditioning load estimation, scheduling of a large number of heat supply devices such as chillers can be performed at an accurate timing, and proper parameters can be set for an air-conditioning controller in a building.

Since the reliability of an estimated value can be displayed, in addition to accurate estimation, erroneous use of an estimated value can be prevented. This is of a great benefit to the field of control accompanying danger. Therefore, the user can perform more accurate operations with ease and comfort, reducing the load of the user.

FIG. 17 shows a chiller. Referring to FIG. 17, reference numeral 111 denotes a refrigerating portion; 112, a regenerator; and 113, a condenser.

The refrigerating portion 111 receives circulated water from the user and cools the water by using the vaporization heat of a liquid, thus supplying the water as cool water to the user. In this case, steam generated when the circulated water from the user is cooled is absorbed by an absorption liquid of lithium bromide (LiBr). However, the absorption capacity of the absorption liquid is reduced as the liquid is diluted. For this reason, the absorption liquid is heated and condensed by the regenerator 112, while steam generated in the regenerator 112 when the absorption liquid is heated is liquified into a refrigerant by condenser 113. With this refrigerant, cool water to be supplied to the user is further cooled.

FIG. 18 shows the third embodiment of the present invention, in which an inference unit 20 is applied to the chiller described above to estimate a steam supply amount when a steam amount is supplied to a regenerator 112 for heating/condensing an absorption liquid.

This steam amount supplying/estimating apparatus comprises a generation means 21 for a causal relationship model, a storage section 23 for a causal relationship model, an inference means 25, an estimated steam amount storage section 121, a performance deterioration index generation means 122, and an optimal operation information generation means 123.

As input variables for the above-described chiller, temperatures at the respective portion indicated by symbols A to G in FIG. 17 may be considered. More specifically, the following are considered as input variables: a cooling water inlet temperature as a temperature at a cool water inlet A, a temperature at a cool water tower inlet B, a high-pressure regenerator outlet temperature as a temperature at an outlet C of the regenerator 112, a temperature at an outlet D of a low-pressure regenerator 114, a temperature (refrigerant condenser outlet temperature) at an outlet E of a condenser 113, a refrigerant evaporator outlet temperature indicated by a point F, a temperature at a cool water outlet indicated by a point G, and an outside temperature and an external humidity as external conditions for the chiller.

In the generation means 21 for a causal relationship model in this embodiment, of these input variables, four elements, i.e., the outside temperature, the cooling water inlet temperature, the high voltage regenerator outlet temperature 112, and the refrigerant evaporator outlet temperature, are handled as input variables. In addition, the generation means 21 for a causal relationship model handles a steam amount supplied to the regenerator 112 as an output variable, generates an input/output relationship model from these input/output variables recorded in the past, and stores the model in the storage section 23 for a causal relationship model.

Upon reception of new input variables, the inference means 25 performs inference on the basis of the past input/output relationship model stored in the storage section 23 for a causal relationship model, and estimates a steam amount as an output variable. This estimated steam amount is stored in the estimated steam amount storage section 121.

The performance deterioration index generation means 122 generates a performance deterioration index of the chiller on the basis of the difference between the actual measurement value and the estimated steam amount for the same input event, and designates a proper maintenance period.

The optimal operation information generation means 123 generates information for the optimal operation of the chiller on the basis of the estimated steam amount.

In this embodiment, an input/output relationship model is generated from historical data obtained at the same time because a delay time of an input/output relationship is not considered. In this case, the quantization number for the input space is set to be "30" in consideration of a required output precision.

In a performance deterioration diagnosis model used by the performance deterioration index generation means 122 and indicating an input/output relationship model of the chiller, data obtained in one hour are treated as one set of data. In addition, in an optimal operation information model of the chiller used in the optimal operation information generation means 123 and serving as the above-described input/output relationship model, data obtained in 30 minutes are treated as one set of data. This is because the processing timing varies depending on the purpose of processing.

These data for modeling were constituted by the first half of data measured from the chiller which was actually operated during a period from the second week to the third week in June, 1992, and actual measurement data of outside temperatures measured in this period. The second half of the data is used to verify the generated input/output relationship model.

FIGS. 19 and 20 respectively show results obtained when the inference means 25 performed inference using verification data upon actually performing performance deterioration diagnosis of the chiller and generating each input/output relationship model for optimal operation information. Note that the solid curves and the broken curves in FIGS. 19 and 20 respectively indicate actual measurement values and estimated values based on models.

According to the performance deterioration diagnosis model estimation result shown in FIG. 19, the error (|actual measurement value—estimated value|/actual measurement value) is about 4%. According to the optimal operation information model estimation result shown in FIG. 20, the error is about 7%. That is, an estimation result is much higher in precision than that obtained by using a mathematical model such as a recurrence model, in which the error is about 25%.

The functional operations of the performance deterioration index generation means 122 for generating a performance deterioration index of the chiller by using these models and of the optimal operation information generation means 123 for generating optimal operation information for the chiller will be described in detail next. The performance deterioration index generation means 122 will be described first.

The performance deterioration index generation means 122 generates an index for the performance maintenance of the chiller and for a maintenance period by using the above-described input/output relationship model. In forming this index, a model in a period during which maintenance is performed is generated, and a condition in which the state of a system can be more easily observed is set on the basis of a simulation result obtained by using the model and the density of cases, thereby performing deterioration diagnosis of the system. That is, as in the case of steam amounts corresponding to sample counts 12 to 16 on the abscissa in FIG. 19, a condition in which a model precision of 1% or less can be estimated is grasped in accordance with neighborhoods based on a topology, and a value based on the model in this condition is compared with an actual measurement value, thereby performing deterioration diagnosis of the system. In other words, a condition in which the state of the system can be easily observed is set, and determination on a maintenance period is performed by checking how much the current steam amount exhibits energy loss with respect to the same input event of the system in comparison with the initial value for the maintenance.

FIG. 21 shows a situation in which an index during a maintenance period is generated. In this case, an important thing is that the same input event of the system can be identified under complicated changing situation. This can be done on the basis of similarities in the inference means 25 described above.

The optimal operation information generation means i23 generates optimal operation information for minimizing the operation cost when information required to perform an optimal operation in a district heating/cooling (DHC) system or a system including a chiller. In this case, If the above-described input/output relationship model is used, a steam amount can be estimated by setting an estimated value based on another estimation model or an estimated value entered by the operator in an input condition. Alternatively, estimation may be performed with respect to the current input condition in consideration of a delay time in the input/output relationship model of the chiller itself. FIG. 22 shows a situation in which such optimal operation information is generated.

If a model for estimating a steam amount is generated and estimation is performed in consideration of an outside temperature, a cooling water inlet temperature, a regenerator outlet temperature, and a refrigerant evaporator outlet temperature as input variables, the characteristics of the chiller can be accurately monitored under a system condition which dynamically changes. Therefore, an accurate performance deterioration index can be provided. With this index, maintenance of the chiller can be performed in a proper period instead of performing maintenance in a summertime which is the operation period of the chiller. In addition, the breakdown of the chiller can be prevented during its operation period.

Furthermore, since information required to perform an optimal operation can be provided in a system including a chiller, e.g., a district heating/cooling (DHC) system, a reduction in system operation cost and operation energy can be achieved, and the loads of the respective devices constituting the system can be leveled.

As has been described above, according to the present invention, the value of output data is inferred from a plurality of input data as input factors in the following manner, providing that input and output data are time series data which continuously change. A causal relationship model is generated from past input and output data on the basis of the concept of continuous mapping of a topology. When new data is input, the value of output data is inferred from the causal relationship model. Therefore, state estimation of a system can be performed in accordance with only cases representing individual events in the system without standardizing an input/output relationship in the system. Consequently, a method of estimating the state of a system can be generalized and simplified, and the state of the system can be accurately estimated.

When an input space is quantized and divided into m portions, case data in the input space is converted into m-odic data. Therefore, the case data can be compressed. Consequently, the capacity of a storage means (memory) for storing the case data can be reduced. In addition, since a large number of cases can be developed in the storage means, arithmetic processing can be performed at high speed.

When new output data corresponding to new input data is obtained, the number of times of occurrence of output data corresponding to the new input data, the mean value of the output data, and the mean value of the change amounts of the output data are updated, thereby easily modifying a model without changing parameters as in the prior art. Therefore, the system can be operated on line. In addition, since the reliability of a model corresponding to a new condition and used cases can be disclosed independently, the qualitative relationship between the model and the condition can be indicated, thus preventing erroneous use of the output value of the model.

If the quantization number is large, case data are divided and classified according to a predetermined criterion. The overall range of each classified case data is quantized to count the number of times of occurrence of the classified case data, and normalization is performed with the maximum value to form a possibility distribution. When new input data is given, the possibility of attribution of the new input data with respect to the possibility distribution is determined. Therefore, a model for describing the state of a system having a complicated input/output relationship model can be easily generated, and the state of the system can be easily estimated on the basis of the model.

When the present invention is applied to a system including a chiller, steam amounts to the system is estimated precisely under complicated changing situation, and a performance deterioration index of the system and optimal operation information are generated from the steam amount. Therefore, maintenance of the system can be performed in a proper period, and the system operation cost can be reduced.

What is claimed is:

1. A state estimating apparatus for inferring a value of single output data from a plurality of input data given as input factors and estimating a state of a system, the plurality of input data and the single output data being time series data which continuously change, and the plurality of input data and the single output data having an implicit relationship which continuously changes, comprising:

input space quantization means for quantizing an input space having the input data from case data indicating a plurality of past input data and past single output data stored in advance, in accordance with a required precision of the single output data;

storage means for calculating a number of times of occurrence of the single output data corresponding to each input event in the input space quantized by said input space quantization means, a mean value of the single output data, and a mean value of change amounts of the single output data, and for storing a set of the number of times of occurrence and the mean values as a causal relationship model;

means for, on the basis of a concept of continuous mapping of a topology, calculating a neighborhood of the input space which satisfies the required precision of the single output data as a statistical amount of all input data of the case data, and for expressing the calculated neighborhood of the input space as a quantization number by which the input space is quantized;

similar case extraction means for, when a new input event is input, enlarging the calculated neighborhood of the input space to a predetermined degree, and extracting an input case similar to the calculated neighborhood from an input case in the input space;

similarity determination means for determining a similarity between the new input event and the extracted similar input case on the basis of the predetermined degree of enlarging; and estimating means for selecting an input case corresponding to the similarity determined by said similarity determination means from the extracted similar input case, and estimating a value of output data corresponding to the new input event on the basis of the mean value of the single output data corresponding to the selected input case and the mean value of change amounts of the single output data.

2. The state estimating apparatus according to claim 1, further comprising means for, when the input space is quantized and divided into m portions by said input space quantization means, converting case data in the input space into m-odic data, and means for inversely converting the extracted similar input case extracted by said similar case extraction means.

3. The state estimating apparatus according to claim 1, further comprising means for, when the new input event and the estimated value of output data are obtained, updating the number of times of occurrence of the single output data corresponding to an input event which corresponds to the new input event, a mean value of the single output data, and a mean value of change amounts of the single output data, if single output data corresponding to the output data of estimated value are stored in said storage means, and adding the estimated value of output data to said storage means if output data corresponding to the estimated value of output data are absent from said storage means.

4. A state estimating apparatus for generating one output data as an output result from a plurality of input data and estimating a state of a system from the plurality of input data given as input factors, the plurality of input data and the output data being time series data which continuously change, and the plurality of input data and the output data having a relationship which continuously changes, comprising:

input space quantization means for quantizing an input space having the plurality of input data from case data indicating past input and output data stored in advance, in accordance with a required precision of the output data;

classification means for dividing the case data into clusters according to a predetermined criterion when a quantization number for quantization performed by said input space quantization means exceeds a predetermined value;

counting means for quantizing an overall range of the past input and output data stored in advance and counting a number of times of occurrence of classified case data for each quantization number for each case data classified by said classification means;

possibility distribution generation means for generating a possibility distribution by performing normalization using a maximum value of the counted number of times of occurrence;

determination means for displaying the possibility distribution generated for each classified case data, identifying a generated possibility on the basis of a predetermined criterion, and determining whether to use the possibility distribution; and possibility-of-attribution determination means for, when a new input event is input, determining a possibility of attribution of the new input event with respect to each cluster, generated by said classification means, by using the possibility distribution.

5. The state estimating apparatus according to claim 1, further comprising:

classification means for dividing the case data into clusters according to a predetermined criterion when the quantization number for quantization performed by said input space quantization means exceeds a predetermined value;

counting means for quantizing an overall range of the past input and output data stored in advance and counting a number of times of occurrence of classified case data for each quantization number for each case data classified by said classification means;

possibility distribution generation means for generating a possibility distribution by performing normalization using a maximum value of the counted number of times of occurrence;

determination means for displaying the possibility distribution generated for each classified case data, identifying a generated possibility on the basis of a predetermined criterion, and determining whether to use the possibility distribution; and possibility-of-attribution determination means for, when a new input event is input, determining a possibility of attribution of the new input event with respect to each cluster, generated by said classification means, by using the possibility distribution, wherein a weighted mean of the possibilities of attribution and estimated values obtained by said estimating means for each cluster is calculated to determine a final estimated value.

6. The state estimating apparatus according to claim 1, further comprising:

data selecting means for, when the system is a system including a chiller, setting a steam amount supplied to the chiller as the single output data and selecting an outside temperature outside the chiller, a cooling water inlet temperature of the chiller, a high voltage regenerator outlet temperature of the chiller, and a refrigerant evaporator outlet temperature of the chiller as the plurality of input data serving as input factors;

means for generating the causal relationship model from input and output data obtained immediately after execution of maintenance of the chiller;

steam amount estimating means for estimating the steam amount indicating output data on the basis of the causal relationship model when a new input event is input;

means for generating a performance deterioration index of the system including the chiller from an actual steam amount obtained in a condition in which a state of the system can be easily grasped and an estimated steam amount indicating output data obtained immediately after execution of maintenance of the system; and means for generating optimal operation information for supplying an optimal steam amount to the system including the chiller on the basis of the estimated steam amount.

* * * * *